US011735929B1

(12) United States Patent
Kondo

(10) Patent No.: US 11,735,929 B1
(45) Date of Patent: Aug. 22, 2023

(54) POWER SUPPLY STATION

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

(*) Notice: Subject to any disclaimer, the term of this patent is extended or adjusted under 35 U.S.C. 154(b) by 0 days.

(21) Appl. No.: 18/023,999

(22) PCT Filed: Oct. 26, 2021

(86) PCT No.: PCT/JP2021/039452
§ 371 (c)(1),
(2) Date: Feb. 28, 2023

(87) PCT Pub. No.: WO2022/092073
PCT Pub. Date: May 5, 2022

(30) Foreign Application Priority Data

Oct. 30, 2020 (WO) .................. PCT/JP2020/040935
Apr. 26, 2021 (WO) .................. PCT/JP2021/016596
(Continued)

(51) Int. Cl.
*H02J 3/46* (2006.01)
*H02J 7/35* (2006.01)
(Continued)

(52) U.S. Cl.
CPC ................ *H02J 3/46* (2013.01); *B60L 53/51* (2019.02); *B60L 53/52* (2019.02); *B60L 53/54* (2019.02);
(Continued)

(58) Field of Classification Search
CPC .. H02J 3/46; H02J 7/35; H02J 2300/28; H02J 2300/24; H02J 2300/30; B60L 53/54; B60L 53/51; B60L 53/52; F24H 1/18
See application file for complete search history.

(56) References Cited

U.S. PATENT DOCUMENTS

2003/0209375 A1    11/2003   Suzuki et al.
2008/0025880 A1     1/2008   Shurtleff et al.
(Continued)

FOREIGN PATENT DOCUMENTS

JP    H6-66787 A     3/1994
JP    H7-108909 A    4/1995
(Continued)

OTHER PUBLICATIONS

International Search Report issued in PCT/JP2021/039452 dated Dec. 21, 2021 with English Translation (5 pages).
(Continued)

*Primary Examiner* — Robert L Deberadinis
(74) *Attorney, Agent, or Firm* — Nakanishi IP Associates, LLC

(57) ABSTRACT

A first power and hydrogen supply station includes a hydrogen storage unit including a hydrogen generation device that performs electrolysis of an electrolytic solution to generate hydrogen, a first flow rate control device that controls a supply amount of hydrogen obtained by the hydrogen generation device, and an accumulation unit that accumulates hydrogen obtained by the hydrogen generation device, includes a fuel cell (second power generation device) that generates power based on at least one of hydrogen obtained by the hydrogen generation device and hydrogen accumulated in the accumulation unit, includes a fuel cell power storage unit (second power storage unit) that accumulates power obtained by the fuel cell, and includes an auxiliary power supply (third power storage unit). A charge capacity of a power storage device of the fuel cell power storage unit is larger than a charge capacity of a power storage device of the auxiliary power supply.

5 Claims, 17 Drawing Sheets

(30) Foreign Application Priority Data

| | | | |
|---|---|---|---|
| May 17, 2021 | (WO) | ................ | PCT/JP2021/018528 |
| Jun. 30, 2021 | (WO) | ................ | PCT/JP2021/024698 |
| Aug. 10, 2021 | (WO) | ................ | PCT/JP2021/029485 |

(51) Int. Cl.

| | |
|---|---|
| *B60L 53/54* | (2019.01) |
| *B60L 53/51* | (2019.01) |
| *B60L 53/52* | (2019.01) |
| *F24H 1/18* | (2022.01) |

(52) U.S. Cl.
CPC ................ *H02J 7/35* (2013.01); *F24H 1/18* (2013.01); *H02J 2300/24* (2020.01); *H02J 2300/28* (2020.01); *H02J 2300/30* (2020.01)

(56) References Cited

U.S. PATENT DOCUMENTS

| | | |
|---|---|---|
| 2008/0039538 A1 | 2/2008 | Olah et al. |
| 2008/0220480 A1 | 9/2008 | Olah et al. |
| 2008/0226954 A1 | 9/2008 | Gil et al. |
| 2008/0241610 A1 | 10/2008 | Gil et al. |
| 2012/0158229 A1 | 6/2012 | Schaefer |
| 2014/0091762 A1 | 4/2014 | Kondo |
| 2017/0303443 A1 | 10/2017 | Inano et al. |
| 2019/0131914 A1 | 5/2019 | Ramirez et al. |
| 2019/0152605 A1 | 5/2019 | Tillotson et al. |
| 2019/0357385 A1 | 11/2019 | Miyazaki |
| 2019/0386491 A1 | 12/2019 | Ito et al. |
| 2020/0343733 A1 | 10/2020 | Crawford |

FOREIGN PATENT DOCUMENTS

| | | |
|---|---|---|
| JP | 2000-54174 A | 2/2000 |
| JP | 2001-57711 A | 2/2001 |
| JP | 2002-89792 A | 3/2002 |
| JP | 2002-343405 A | 11/2002 |
| JP | 2003-257443 A | 9/2003 |
| JP | 2005-180161 A | 7/2005 |
| JP | 2005-295616 A | 10/2005 |
| JP | 2006-236741 A | 9/2006 |
| JP | 2008-11614 A | 1/2008 |
| JP | 2008-230953 A | 10/2008 |
| JP | 2010-500362 A | 1/2010 |
| JP | 2010-190484 A | 9/2010 |
| JP | 2012-54385 A | 3/2012 |
| JP | 2012-523551 A | 10/2012 |
| JP | 2013-041324 A | 2/2013 |
| JP | 2014-070228 A | 4/2014 |
| JP | 2014-074207 A | 4/2014 |
| JP | 2014-122399 A | 7/2014 |
| JP | 2017-191431 A | 10/2017 |
| JP | 2019-094051 A | 6/2019 |
| JP | 2019-515617 A | 6/2019 |
| JP | 2019-133803 A | 8/2019 |
| JP | 2019-200632 A | 11/2019 |
| JP | 2019-200839 A | 11/2019 |
| JP | 2019-221126 A | 12/2019 |
| JP | 2020-078104 A | 5/2020 |
| JP | 2020-129197 A | 8/2020 |
| WO | 2008/021698 A2 | 2/2008 |
| WO | 2012/169086 A1 | 12/2012 |
| WO | 2017/098662 A1 | 6/2017 |

OTHER PUBLICATIONS

Written Opinion of International Searching Authority issued in PCT/JP2021/039452 dated Dec. 21, 2021 with English Translation (5 pages).
International Search Report issued in PCT/JP2021/039453 dated Dec. 28, 2021 with English Translation (7 pages).
Written Opinion of International Searching Authority issued in PCT/JP2021/039453 dated Dec. 28, 2021 with English Translation (7 pages).
International Search Report issued in PCT/JP2020/040935 dated Dec. 22, 2020 with English Translation (7 pages).
Written Opinion of International Searching Authority issued in PCT/JP2020/040935 dated Dec. 22, 2020 with English Translation (8 pages).
International Search Report issued in PCT/JP2021/016596 dated Jul. 20, 2021 with English Translation (7 pages).
Written Opinion of International Searching Authority issued in PCT/JP2021/016596 dated Jul. 20, 2021 with English Translation (10 pages).
International Search Report issued in PCT/JP2021/018528 dated Jul. 20, 2021 with English Translation (6 pages).
Written Opinion of International Searching Authority issued in PCT/JP2021/018528 dated Jul. 20, 2021 with English Translation (5 pages).
International Search Report issued in PCT/JP2021/024698 dated Sep. 14, 2021 with English Translation (7 pages).
Written Opinion of International Searching Authority issued in PCT/JP2021/024698 dated Sep. 14, 2021 with English Translation (7 pages).
International Search Report issued in PCT/JP2021/029485 dated Oct. 26, 2021 with English Translation (7 pages).
Written Opinion of International Searching Authority issued in PCT/JP2021/029485 dated Oct. 26, 2021 with English Translation (7 pages).
Notification of Reasons for Refusal issued in Japanese Patent Application No. 2022-527157 dated Jun. 2, 2022 with English Translation (4 pages).
Decision to Grant Patent issued in Japanese Patent Application No. 2022-527157 dated Aug. 9, 2022 with English Translation (6 pages).

Fig. 5

| Name | Business hours | Required time | Charging status | |
|---|---|---|---|---|
| 1st power and hydrogen supply station | 10:00–22:00 | About 20 minutes | Charging completion, Reservation possible | Reservation (35a1) / Route (35a2) |
| 2nd power and hydrogen supply station | 24 hours | About 15 minutes | During charging, Reservation possible | Reservation (35a1) / Route (35a2) |
| 3rd power and hydrogen supply station | 10:00–20:00 | About 30 minutes | During charging, Reservation impossible | Route (35a2) |
| ... | ... | ... | ... | |

Table: 35a

POWER SUPPLY STATION

TECHNICAL FIELD

The present invention relates to a power supply station and the like.

BACKGROUND ART

In the related art, as in Patent Literature 1, a system that accumulates power and supplies the accumulated power to an electric vehicle or the like has been proposed.

CITATION LIST

Patent Literature

Patent Literature 1: JP 2014-122399 A

SUMMARY OF INVENTION

Technical Problem

However, accumulation of power obtained based on hydrogen is not sufficiently considered.

Therefore, an object of the present invention is to provide a power supply station and the like capable of efficiently accumulating power obtained based on hydrogen.

Solution to Problem

According to the present invention, there is provided a power supply station including: a hydrogen storage unit including a hydrogen generation device that performs electrolysis of an electrolytic solution to generate hydrogen, a first flow rate control device that controls a supply amount of hydrogen obtained by the hydrogen generation device, and an accumulation unit that accumulates hydrogen obtained by the hydrogen generation device; a fuel cell that generates power based on at least one of hydrogen obtained by the hydrogen generation device and hydrogen accumulated in the accumulation unit; a fuel cell power storage unit that accumulates power obtained by the fuel cell; and an auxiliary power supply.

A charge capacity of a power storage device of the fuel cell power storage unit is larger than a charge capacity of a power storage device of the auxiliary power supply.

The fuel cell power storage unit supplies power to an external electric device via an output terminal unit.

The auxiliary power supply supplies power to the first flow rate control device.

The auxiliary power supply operates the inside of the power supply station, and said auxiliary power supply can be used as a starting power supply for supplying hydrogen to the fuel cell. That is, it is possible to efficiently accumulate power obtained based on hydrogen.

Preferably, the power supply station further includes a renewable energy-derived power generation device that generates power based on natural energy, and a power storage unit that accumulates power obtained by the renewable energy-derived power generation device.

The auxiliary power supply accumulates the power obtained by the renewable energy-derived power generation device.

The charge capacity of the power storage device of the power storage unit is larger than the charge capacity of the power storage device of the fuel cell power storage unit.

The hydrogen generation device performs the electrolysis of the electrolytic solution based on power from at least one of the renewable energy-derived power generation device and the power storage unit.

It is possible to accumulate surplus power in the form of hydrogen by using a renewable energy-derived power generation device such as solar power generation. The accumulation of hydrogen makes it easier to accumulate energy in a smaller volume than the accumulation of electricity, and causes less deterioration in long-term accumulation.

More preferably, the power storage unit accumulates power supplied from an external electric device via an input terminal unit.

More preferably, the power supply station further includes a water intake unit that collects moisture contained in a gas generated by electrolysis in the hydrogen generation device.

Water discharged at the time of power generation by the fuel cell and water obtained by the water intake unit are supplied to the hydrogen generation device as the electrolytic solution.

By utilizing water generated in the second power generation device and the hydrogen storage unit as the electrolytic solution, hydrogen can be generated even in a state where supply of water from the outside is small.

More preferably, the power supply station further includes a solar water heater, and a second flow rate control device that controls a flow rate of water discharged at the time of power generation by the fuel cell and water obtained by the water intake unit passing through at least the solar water heater and the hydrogen generation device.

The auxiliary power supply supplies power to the second flow rate control device.

The auxiliary power supply operates the inside of the power supply station, and said auxiliary power supply can be used as a starting power supply for supplying water to the solar water heater or the like.

Advantageous Effects of Invention

As described above, according to the present invention, it is possible to provide a power supply station and the like capable of efficiently accumulating power obtained based on hydrogen.

BRIEF DESCRIPTION OF DRAWINGS

FIG. 5 is an example of charging information displayed by a first display unit.

DESCRIPTION OF EMBODIMENTS

Hereinafter, the present embodiment will be described with reference to the drawings.

Note that embodiments are not limited to the following embodiments. In addition, contents described in one embodiment are similarly applied to other embodiments in principle. Further, each embodiment and each modification example can be appropriately combined.

Figure 1:
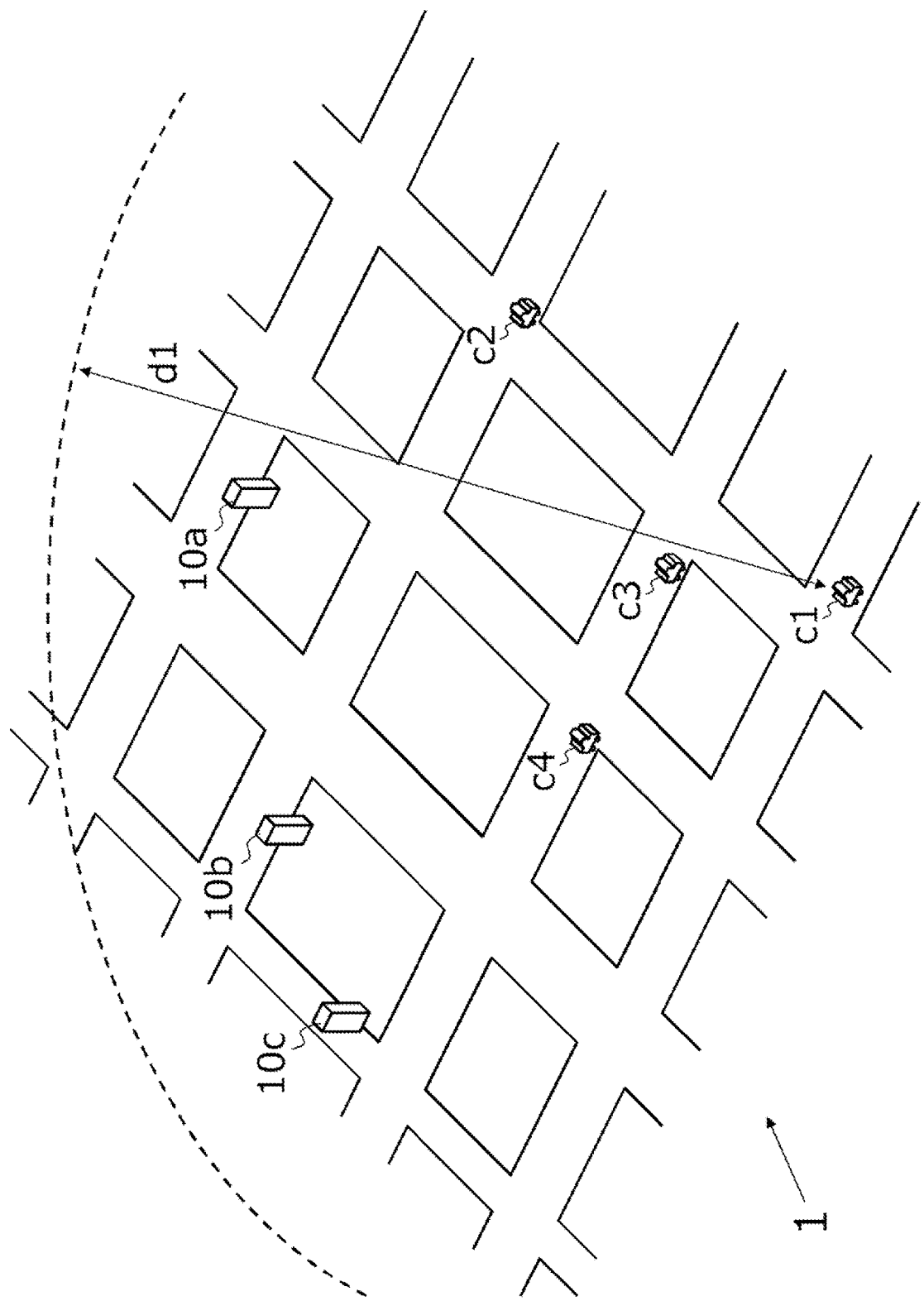
FIG. 1 is a perspective view of a power and hydrogen supply system excluding a server, according to a first embodiment.
Figure 2:
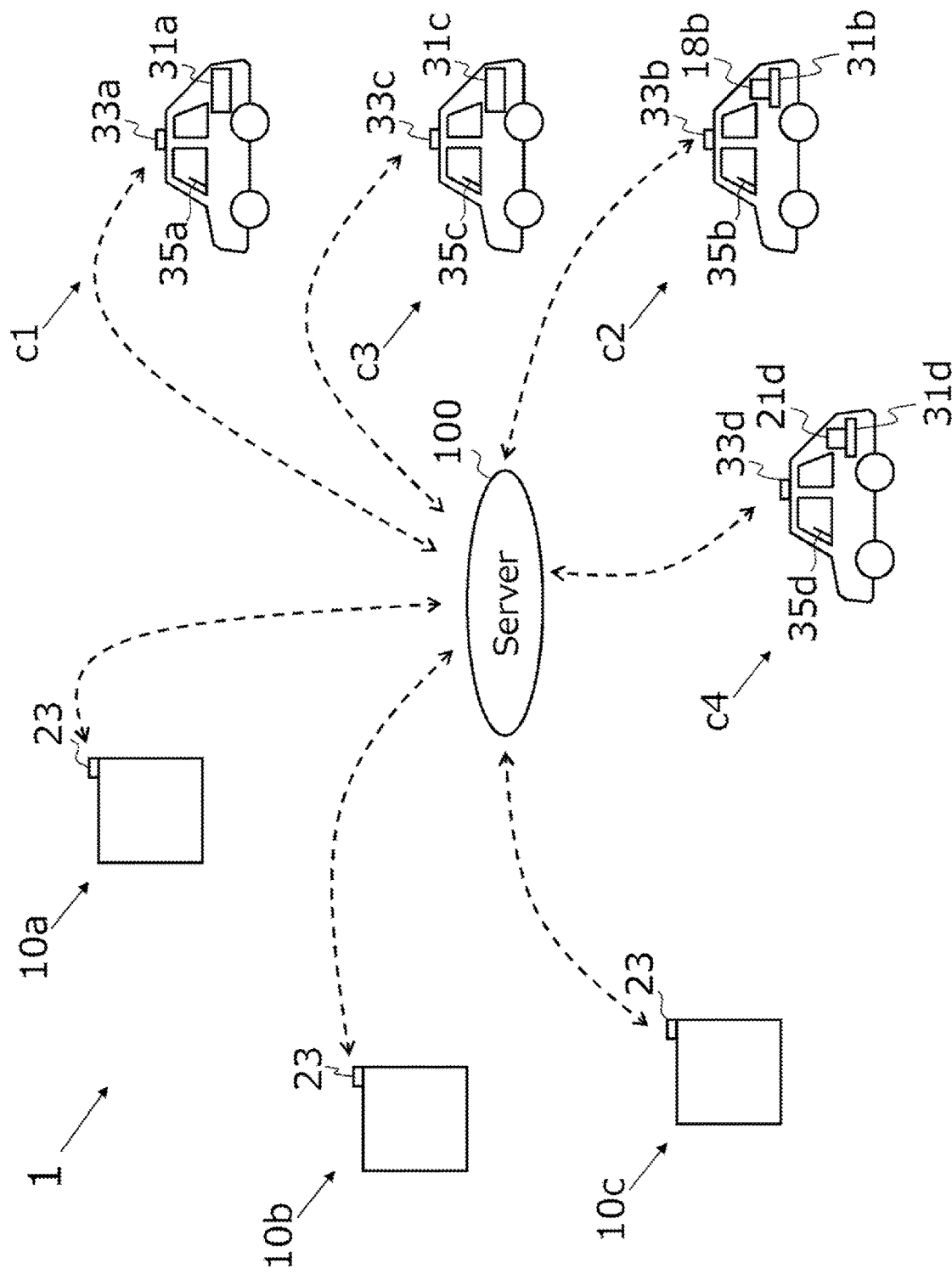
FIG. 2 is a configuration diagram of the power and hydrogen supply system excluding a test target power supply and a load test device, according to the first embodiment.
Figure 3:
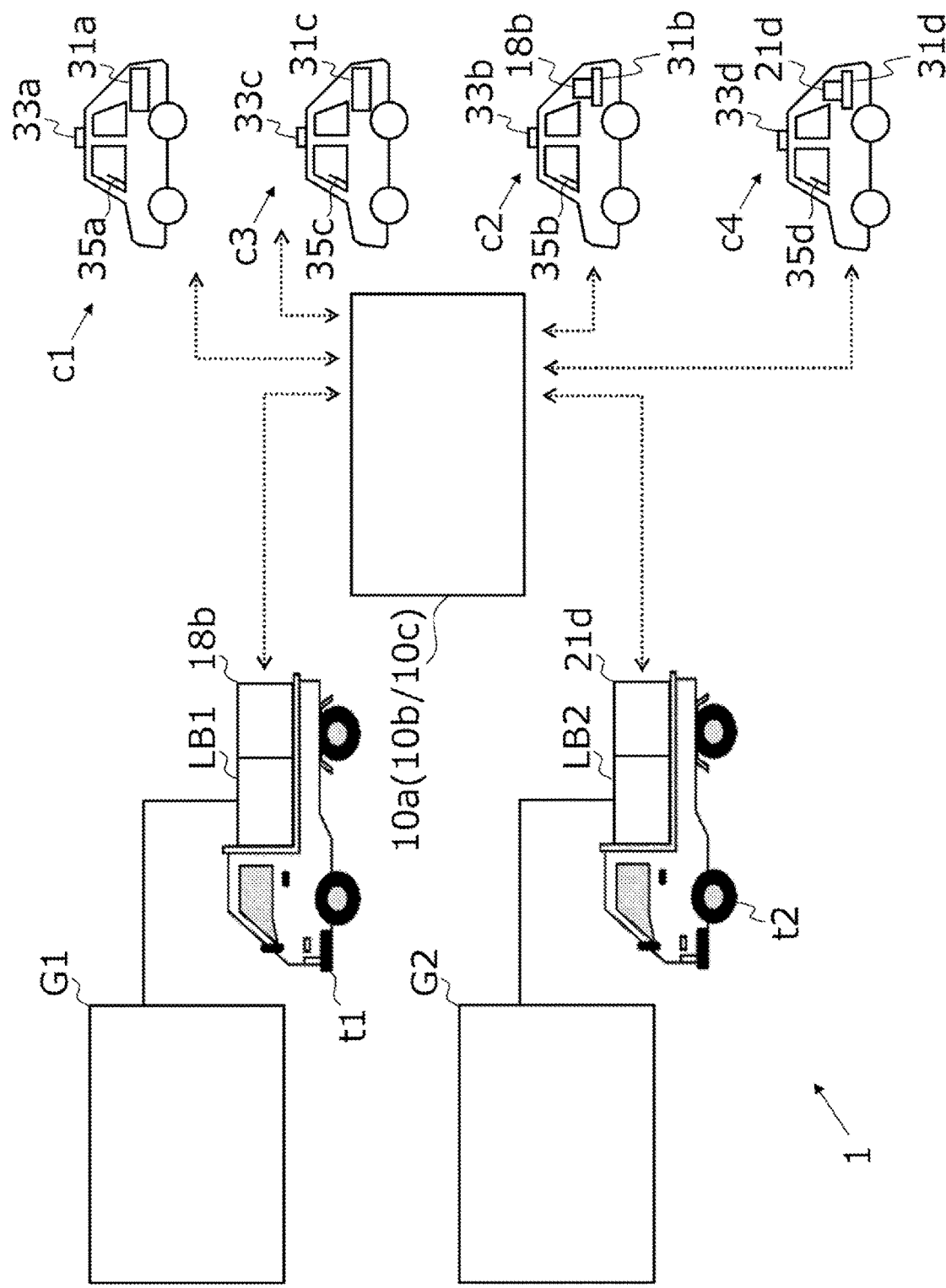
FIG. 3 is a configuration diagram of the power and hydrogen supply system excluding a server, according to the first embodiment.

(Power and Hydrogen Supply System 1) A power and hydrogen supply system 1 of a first embodiment includes a first power and hydrogen supply station 10a, a second power and hydrogen supply station 10b, a third power and hydrogen supply station 10c, a server 100, an electric vehicle (first electric vehicle c1 to fourth electric vehicle c4), a test target power supply (first test target power supply G1 and second test target power supply G2), a load test device (rechargeable load test device LB1, electrolytic load test device LB2), and a load test mobile device (first load test mobile device t1 and second load test mobile device t2) (see FIGS. 1 to 3).

(First Power and Hydrogen Supply Station 10a to Third Power and Hydrogen Supply Station 10c)

Figure 4:
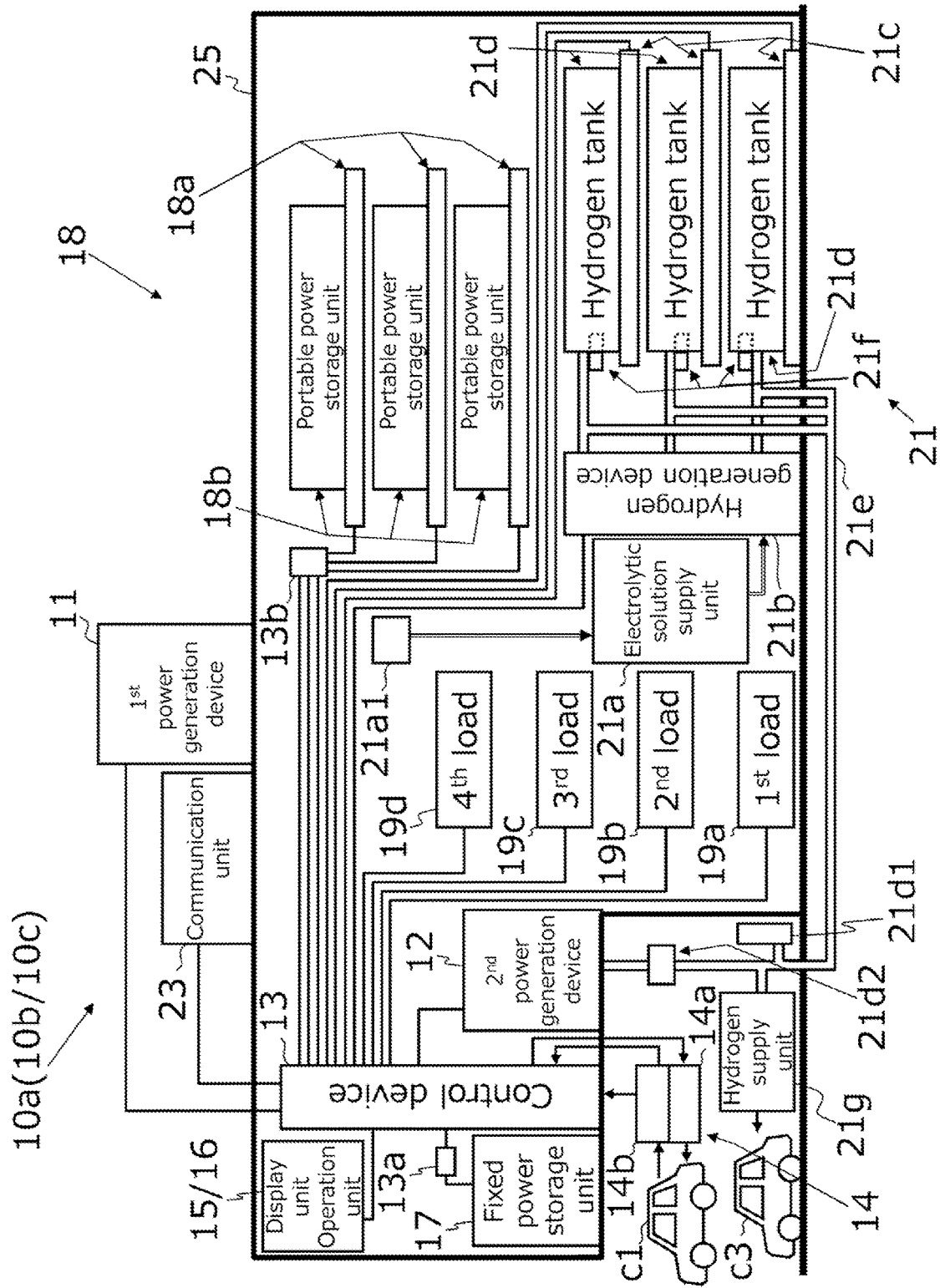
FIG. 4 is a block diagram showing a configuration of one of the power and hydrogen supply stations according to the first embodiment.

Each of the first power and hydrogen supply station 10a to the third power and hydrogen supply station 10c includes a first power generation device 11, a second power generation device 12, a control device 13, a charger 14, a station-side display unit 15, a station-side operation unit 16, a fixed power storage unit 17, a portable power storage unit 18, a load (first load 19a, second load 19b, third load 19c, and fourth load 19d), and a hydrogen storage unit 21 (see FIG. 4).

(First Power Generation Device 11)

The first power generation device 11 is a power generation device (renewable energy-derived power generation device) that generates power on the basis of natural energy (renewable energy), such as a solar power generation device or a wind power generation device.

The first power generation device 11 is always in a state capable of generating power.

However, in a case where the first power generation device 11 is a wind power generation device and a wind power received by the first power generation device 11 exceeds a predetermined wind power, the first power generation device 11 is brought into a state where power generation cannot be performed.

The first power generation device 11 is installed on a rooftop of a building (housing) 25 or the like.

The power obtained by the first power generation device 11 is supplied to the charger 14, the fixed power storage unit 17, the portable power storage unit 18, the load (the first load 19a to the fourth load 19d), the hydrogen storage unit 21, and the like via the control device 13.

(Second Power Generation Device 12)

The second power generation device 12 is a power generation device (fuel cell) that generates power based on hydrogen.

The second power generation device 12 is brought into a state capable of generating power in a case where the power supplied from the first power generation device 11 is not sufficient.

The second power generation device 12 is installed inside the building 25, on the rooftop of the building 25, or the like.

The power obtained by the second power generation device 12 is supplied to the load (the first load 19a to the fourth load 19d) and the like via the control device 13.

That is, normally, the power obtained by second power generation device 12 is not supplied to the hydrogen storage unit 21. However, when a load test of the second power generation device 12 to be described later is performed, the power obtained by the second power generation device 12 is also supplied to the hydrogen generation device 21b of the hydrogen storage unit 21 and the like.

In addition, water discharged at the time of power generation by the second power generation device 12 may be supplied to an electrolytic solution supply unit 21a as shown in a fourth embodiment described later.

(Control Device 13)

The control device 13 includes a power conditioner, a distribution board, and the like, and performs switching control of a power supply source and switching control of a power supply destination.

Specifically, the control device 13 is connected to the first power generation device 11, the second power generation device 12, the fixed power storage unit 17, and the portable power storage unit 18, on an input side.

Note that the control device 13 may be further connected to a power receiving device (not shown) of a commercial power supply on the input side.

The control device 13 is connected to the charger 14, the station-side display unit 15, the fixed power storage unit 17, the portable power storage unit 18, the load (first load 19a, second load 19b, third load 19c, and fourth load 19d), the hydrogen storage unit 21 (hydrogen generation device 21b, heat retaining and cooling unit 21c, detecting device 21f, hydrogen supply unit 21g), and a communication unit 23, on an output side.

However, the first power generation device 11 may be directly connected to portable power storage unit 18, hydrogen generation device 21b, and the like without through the control device 13.

The control device 13 is installed inside the building 25 or the like.

(Input Switching Control)

In a case where power P supplied from the first power generation device 11 is smaller than a power threshold Thp, a charge rate (state of charge) R1 of the fixed power storage unit 17 is lower than a first charge rate threshold Thr1, and/or a charge rate R2 of the portable power storage unit 18 is lower than a second charge rate threshold Thr2, it is determined that the power supplied from the first power generation device 11 or the like is not sufficient, and the control device 13 is connected to the second power generation device 12 and receives the power supplied from the second power generation device 12.

In this case, the second power generation device 12 receives supply of hydrogen from a hydrogen tank 21d of the hydrogen storage unit 21, and generates power.

In this case, the hydrogen generation device 21b is stopped.

In this case, the control device 13 may maintain the connection with the first power generation device 11 or may cut off the connection with the first power generation device 11.

Note that the charge rate R2 of the portable power storage unit 18 is the charge rate R2 of any of portable power storage devices 18b attached to holding units 18a of the portable power storage unit 18, and indicates the lowest value.

However, when a hydrogen filling rate R3 of the hydrogen storage unit 21 is lower than a first hydrogen filling rate threshold Thr3, power supply from the second power generation device 12 to the control device 13 is not performed. In this case, the control device 13 receives power supply from the fixed power storage unit 17 or the portable power storage unit 18.

The hydrogen filling rate R3 of the hydrogen storage unit 21 is the hydrogen filling rate R3 of any one of the hydrogen tanks 21d attached to the heat retaining and cooling unit 21c of the hydrogen storage unit 21, and indicates the highest value.

The hydrogen filling rate R3 is defined as a ratio of a occluded amount (cc/g or wt %) of hydrogen (absorbed by the hydrogen storage alloy) filling the hydrogen tank 21d to the maximum occluded amount of hydrogen capable of filling the hydrogen tank 21d.

The hydrogen filling rate R3 is calculated based on an expansion rate of a hydrogen storage alloy detected by the detecting device 21f such as a strain sensor attached to said hydrogen storage alloy of the hydrogen tank 21d.

The hydrogen filling rate R3 may be calculated based on an amount of hydrogen flowing into the hydrogen tank 21d, an amount of hydrogen discharged, and the like detected by the detecting device 21f such as a flow rate sensor provided in a communication pipe 21e. The communication pipe 21e communicates with the second power generation device 12, the hydrogen generation device 21b, the hydrogen tank 21d, and the hydrogen supply unit 21g.

(Use Priority (1) of Power Supply Device)

In the first embodiment, the power from the first power generation device 11 is supplied to the first load 19a to the fourth load 19d or the like with a first priority, the power from the fixed power storage unit 17 is supplied to the first load 19a to the fourth load 19d or the like with a second priority, the power from the portable power storage unit 18 is supplied to the first load 19a to the fourth load 19d or the like with a third priority, and the power from the second power generation device 12 is supplied to the first load 19a to the fourth load 19d or the like with a fourth priority.

In this case, the power from the first power generation device 11 is supplied to the station-side display unit 15, the fixed power storage unit 17, the portable power storage unit 18, the load (the first load 19a to the fourth load 19d), the hydrogen storage unit 21, and the communication unit 23 via the control device 13.

When the power P supplied from the first power generation device 11 is smaller than the power threshold Thp, the power from the fixed power storage unit 17 is supplied to the station-side display unit 15, the load (the first load 19a to the fourth load 19d), and the communication unit 23 via the control device 13. However, the power is not supplied from the fixed power storage unit 17 to the portable power storage unit 18 and the hydrogen storage unit 21.

When the charge rate R1 of the fixed power storage unit 17 is lower than the first charge rate threshold Thr1, the power from the portable power storage unit 18 is supplied to the station-side display unit 15, the load (the first load 19a to the fourth load 19d), and the communication unit 23 via the control device 13. However, the power is not supplied from the portable power storage unit 18 to the fixed power storage unit 17 and the hydrogen storage unit 21.

When the charge rate R2 of the portable power storage unit 18 is lower than the second charge rate threshold Thr2, the power from the second power generation device 12 is supplied to the station-side display unit 15, the load (the first load 19a to the fourth load 19d), and the communication unit 23 via the control device 13. However, the power is not supplied from the second power generation device 12 to the fixed power storage unit 17, the portable power storage unit 18, and the hydrogen storage unit 21.

(Use priority (2) of Power Supply Device) However, the use priority of the power supply devices (first power generation device 11, second power generation device 12, fixed power storage unit 17, portable power storage unit 18) is not limited to the use priority (1) described above.

For example, the power from the first power generation device 11 may be supplied to the first load 19a to the fourth load 19d with a first priority, the power from the second power generation device 12 may be supplied to the first load 19a to the fourth load 19d with a second priority, the power from the fixed power storage unit 17 may be supplied to the first load 19a to the fourth load 19d with a third priority, and the power from the portable power storage unit 18 may be supplied to the first load 19a to the fourth load 19d with a fourth priority.

In this case, the power from the first power generation device 11 is supplied to the station-side display unit 15, the fixed power storage unit 17, the portable power storage unit 18, the load (the first load 19a to the fourth load 19d), the hydrogen storage unit 21, and the communication unit 23 via the control device 13.

When the power P supplied from the first power generation device 11 is smaller than the power threshold Thp, the power from the second power generation device 12 is supplied to the station-side display unit 15, the load (the first load 19a to the fourth load 19d), and the communication unit 23 via the control device 13. However, the power is not supplied from the second power generation device 12 to the fixed power storage unit 17, the portable power storage unit 18, and the hydrogen storage unit 21.

When the hydrogen filling rate R3 of the hydrogen storage unit 21 is lower than the first hydrogen filling rate threshold Thr3, the power from the fixed power storage unit 17 is supplied to the station-side display unit 15, the load (the first load 19a to the fourth load 19d), and the communication unit 23 via the control device 13. However, the power is not supplied from the fixed power storage unit 17 to the portable power storage unit 18 and the hydrogen storage unit 21.

When the charge rate R1 of the fixed power storage unit 17 is lower than the first charge rate threshold Thr1, the power from the portable power storage unit 18 is supplied to the station-side display unit 15, the load (the first load 19a to the fourth load 19d), and the communication unit 23 via the control device 13. However, the power is not supplied from the portable power storage unit 18 to the fixed power storage unit 17 and the hydrogen storage unit 21.

(Use Priority (3) of Power Supply Device) In addition, for example, the power from the first power generation device 11 may be supplied to the first load 19a to the fourth load 19d with a first priority, the power from the fixed power storage unit 17 may be supplied to the first load 19a to the fourth load 19d with a second priority, the power from the second power generation device 12 may be supplied to the first load 19a to the fourth load 19d with a third priority, and the power from the portable power storage unit 18 may be supplied to the first load 19a to the fourth load 19d with a fourth priority.

In this case, the power from the first power generation device 11 is supplied to the station-side display unit 15, the fixed power storage unit 17, the portable power storage unit 18, the load (the first load 19a to the fourth load 19d), the hydrogen storage unit 21, and the communication unit 23 via the control device 13.

When the power P supplied from the first power generation device 11 is smaller than the power threshold Thp, the power from the fixed power storage unit 17 is supplied to the station-side display unit 15, the load (the first load 19a to the fourth load 19d), and the communication unit 23 via the control device 13. However, the power is not supplied from the fixed power storage unit 17 to the portable power storage unit 18 and the hydrogen storage unit 21.

When the charge rate R1 of the fixed power storage unit 17 is lower than the first charge rate threshold Thr1, the power from the second power generation device 12 is supplied to the station-side display unit 15, the load (the first load 19a to the fourth load 19d), and the communication unit 23 via the control device 13. However, the power is not supplied from the second power generation device 12 to the fixed power storage unit 17, the portable power storage unit 18, and the hydrogen storage unit 21.

When the hydrogen filling rate R3 of the hydrogen storage unit 21 is lower than the first hydrogen filling rate threshold Thr3, the power from the portable power storage unit 18 is supplied to the station-side display unit 15, the load (the first load 19a to the fourth load 19d), and the communication unit 23 via the control device 13. However, the power is not supplied from the portable power storage unit 18 to the fixed power storage unit 17 and the hydrogen storage unit 21.

That is, the control device 13 adjusts the power supplied from the first power generation device 11, the second power generation device 12, and the power storage device (fixed power storage unit 17 and portable power storage unit 18) based on the use priority set using the station-side operation unit 16 or the like.

However, the control device 13 may determine the use priority according to use states of the second power generation device 12, the fixed power storage unit 17, and the portable power storage unit 18, and adjust the power supplied from the first power generation device 11, the second power generation device 12, and the power storage device (fixed power storage unit 17 and portable power storage unit 18) based on the use priority determined by the control device 13.

For example, when a time Ta during which power is supplied from the portable power storage unit 18 during a first time TT1 (for example, TT1=24 hours) in the past from a current point of time is shorter than a time threshold Tht, the control device 13 determines the use priority such that the power from the first power generation device 11 is supplied to the first load 19a to the fourth load 19d or the like with first priority, the power from the fixed power storage unit 17 is supplied to the first load 19a to the fourth load 19d or the like with second priority, the power from the portable power storage unit 18 is supplied to the first load 19a to the fourth load 19d or the like with third priority, and the power from the second power generation device 12 is supplied to the first load 19a to the fourth load 19d or the like with fourth priority.

Further, for example, when the time Tb during which the power supply from the fixed power storage unit 17 is performed during the first time TT1 in the past from the current point of time is equal to or longer than the time Tc during which the power supply from the second power generation device 12 is performed, the control device 13 determines the use priority such that the power from the first power generation device 11 is supplied to the first load 19a to the fourth load 19d with the first priority, the power from the second power generation device 12 is supplied to the first load 19a to the fourth load 19d with the second priority, the power from the fixed power storage unit 17 is supplied to the first load 19a to the fourth load 19d with the third priority, and the power from the portable power storage unit 18 is supplied to the first load 19a to the fourth load 19d with the fourth priority.

Further, for example, the time Tb during which the power supply from the fixed power storage unit 17 is performed during the first time TT1 in the past from the current point of time is shorter than the time Tc during which the power supply from the second power generation device 12 is performed, the control device 13 determines the use priority such that the power from the first power generation device 11 is supplied to the first load 19a to the fourth load 19d with the first priority, the power from the fixed power storage unit 17 is supplied to the first load 19a to the fourth load 19d with the second priority, the power from the second power generation device 12 is supplied to the first load 19a to the fourth load 19d with the third priority, and the power from the portable power storage unit 18 is supplied to the first load 19a to the fourth load 19d with the fourth priority.

It is explained that the power supply from the fixed power storage unit 17 to the portable power storage unit 18 and the hydrogen storage unit 21, the power supply from the portable power storage unit 18 to the fixed power storage unit 17 and the hydrogen storage unit 21, and the power supply from the second power generation device 12 to the fixed power storage unit 17, the portable power storage unit 18, and the hydrogen storage unit 21 are not performed, in any of the use priority (1), the use priority (2), and the use priority (3) described above.

However, in consideration of supply and demand balance of power to be supplied to the first electric vehicle c1, hydrogen, the portable power storage device 18b, and the hydrogen tank 21d, at least one of power supply from the fixed power storage unit 17 to the portable power storage unit 18 and the hydrogen storage unit 21, power supply from the portable power storage unit 18 to the fixed power storage unit 17 and the hydrogen storage unit 21, and power supply from the second power generation device 12 to the fixed power storage unit 17, the portable power storage unit 18, and the hydrogen storage unit 21 may be performed.

(Output Switching Control)

The control device 13 is connected to the fixed power storage unit 17.

However, when the charge rate R1 of the fixed power storage unit 17 is close to a fully charged state, and the power P supplied from the first power generation device 11 is larger than the power threshold Thp, the power can be sufficiently supplied from the first power generation device 17 to the load (the first load 19*a* to the fourth load 19*d*), the portable power storage unit 18, and the hydrogen storage unit 21 without using the power accumulated in the fixed power storage unit 11. Therefore, in such a case, the control device 13 is disconnected to the fixed power storage unit 17.

The portable power storage unit 18 and the control device 13 are always connected to each other.

However, when all the charge rates R2 of the portable power storage devices 18*b* attached to the holding units 18*a* of the portable power storage units 18 are close to the fully charged state, the control device 13 is disconnected to the portable power storage units 18.

In this case, the control device 13 causes the station-side display unit 15 to display a first replacement guide indicating that the charged portable power storage device 18*b* should be removed from the holding unit 18*a*, and the portable power storage device 18*b* in which charging is not completed should be attached to the holding unit 18*a*, or causes a mobile terminal of the user of the first power and hydrogen supplying station 10*a* to display said first replacement guide via the communication unit 23. After the replacement of the portable power storage device 18*b*, the control device 13 is connected to the portable power storage unit 18.

The control device 13 is connected to the load, which is set to the on state by a user or the like, among the loads (first load 19*a*, second load 19*b*, third load 19*c*, and fourth load 19*d*).

The hydrogen storage unit 21 and the control device 13 are always connected to each other.

However, when all the hydrogen filling rates R3 of the hydrogen tank 21*d* attached to the heat retaining and cooling unit 21*c* of the hydrogen storage unit 21 are equal to or higher than the second hydrogen filling rate threshold Thr4 (Thr4>Thr3), it is assumed that the hydrogen tank 21*d* is sufficiently filled with hydrogen, and the control device 13 is disconnected to the hydrogen storage unit 21.

In this case, the control device 13 causes the station-side display unit 15 to display a second replacement guide indicating that the hydrogen tank 21*d* that has been filled with hydrogen should be removed from the heat retaining and cooling unit 21*c*, and the hydrogen tank 21*d* in which filling with hydrogen is not completed should be attached to the heat retaining and cooling unit 21*c*, or causes the mobile terminal of the user of the first power and hydrogen supply station 10*a* to display said second replacement guide via the communication unit 23. After the replacement of the hydrogen tank 21*d*, the control device 13 is connected to the hydrogen storage unit 21.

The control device 13 is connected to the communication unit 23.

(Conversion of AC and DC)

In the first embodiment, it is assumed that power passing through the control device 13 is AC.

Therefore, a device (not shown) that converts the power from DC to AC is provided between a device that generates the DC power, of the first power generation device 11 and the second power generation device 12, and the control device 13.

Between the fixed power storage unit 17 and the control device 13, there is provided a device (first conversion device 13*a*) that converts power from AC to DC and converts power into predetermined current and voltage.

Between the portable power storage unit 18 and the control device 13, a device (second conversion device 13*b*) that converts power from AC to DC and converts power into predetermined current and voltage is provided.

In addition, a device (not shown) that converts power from AC to DC and converts power into predetermined current and voltage is provided between the control device 13 and a device that is driven by DC among the station-side display unit 15, the load (the first load 19*a* to the fourth load 19*d*), and the communication unit 23.

A device (not shown) that converts power from AC to DC and converts power into predetermined current and voltage is provided between the hydrogen generation device 21*b* and control device 13.

However, the power passing through the control device 13 may be DC.

In this case, a device that converts power from AC to DC is provided between a device, which generates AC power, of the first power generation device 11 and the second power generation device 12, and the control device 13.

In addition, a device that converts power from DC to AC is provided between one driven by AC among the station-side display unit 15, the load (the first load 19*a* to the fourth load 19*d*), and the communication unit 23 and the control device 13.

Furthermore, in this case, the first conversion device 13*a* and the second conversion device 13*b* function as devices that convert into predetermined current and voltage.

(Charger 14)

The charger 14 is detachably connected to the first electric vehicle c1 or the like, and supplies power from the first power generation device 11 or the like to the first electric vehicle c1. In addition, the charger 14 may supply the power from the first electric vehicle c1 to the fixed power storage unit 17 and the like. In this case, the charger 14 includes a charging device (first converter 14*a*) that is connected to a charging terminal of the first electric vehicle c1 and charges an in-vehicle power storage device 31*a* of the first electric vehicle c1, and a V2H device (second converter 14*b*) that is connected to a power supply terminal of the first electric vehicle c1 and discharges the in-vehicle power storage device 31*a* of the first electric vehicle c1.

(Station-Side Display Unit 15 and Station-Side Operation Unit 16)

The station-side display unit 15 displays charging information of the fixed power storage unit 17, charging information of the portable power storage device 18*b* attached to the holding unit 18*a* of the portable power storage unit 18, hydrogen filling rate information of the hydrogen tank 21*d* attached to the heat retaining and cooling unit 21*c* of the hydrogen storage unit 21, information regarding the use priority of the power supply device (first power generation device 11, second power generation device 12, fixed power storage unit 17, and portable power storage unit 18), reservation information from the first electric vehicle c1, and the like.

The station-side operation unit 16 is used for an operation of setting said use priority, and the like.

The station-side display unit 15 and the station-side operation unit 16 may be integrally formed by a touch panel or the like, or may be separately formed.

Further, the station-side display unit 15 and the station-side operation unit 16 may be fixed to the building 25 or the like of the first power and hydrogen supply station 10*a*, or may be fixed in a detachable state.

A portable terminal of a user of the first power and hydrogen supply station 10*a* may function as at least one of the station-side display unit 15 and the station-side operation unit 16.

(Fixed Power Storage Unit 17)

The fixed power storage unit 17 includes a power storage device that accumulates power from the first power generation device 11 and the like.

The power storage device of the fixed power storage unit 17 is fixed at a predetermined position inside the building 25 without taking attachment and detachment into consideration.

When the power supply from the first power generation device 11 is not sufficient, the fixed power storage unit 17 supplies the accumulated power to the load (the first load 19*a* to the fourth load 19*d*) and the like via the control device 13.

In addition, the fixed power storage unit 17 also supplies power to an electric device (such as the station-side display unit 15) constituting the first power and hydrogen supply station 10*a* as an auxiliary power supply. However, a power storage device for the auxiliary power supply may be provided separately from the fixed power storage unit 17.

The first conversion device 13*a* and the fixed power storage unit 17 may be used as a rechargeable load test area for performing a load test of the power supply device such as the first power generation device 11.

In this case, at least one of the first conversion device 13*a* and the fixed power storage unit 17 has a first variable structure for adjusting a load amount when performing the rechargeable load test.

For example, as said first variable structure, the first conversion device 13*a* includes a plurality of AC/DC converters. The plurality of AC/DC converters are connected in parallel and connected to one power storage device of the fixed power storage unit 17. Among said plurality of AC/DC converters, the load amount is adjusted by changing the number of AC/DC converters to be used when power is supplied from the test target power supply (the power supply device such as the first power generation device 11) to the fixed power storage unit 17 via the control device 13.

Further, for example, as said first variable structure, the fixed power storage unit 17 includes a plurality of power storage devices. The plurality of power storage devices are connected in parallel and connected to one AC/DC converter of the first conversion device 13*a*. Among said plurality of power storage devices, the load amount is adjusted by changing the number of power storage devices to which power is supplied from a test target power supply (power supply device such as first power generation device 11) via the control device 13 and the first conversion device 13*a*.

Further, for example, as said first variable structure, the first conversion device 13*a* includes a plurality of AC/DC converters, and the fixed power storage unit 17 includes a plurality of power storage devices. Said plurality of AC/DC converters are connected in parallel. Said plurality of power storage devices are connected in parallel. Each of said plurality of AC/DC converters is connected to said plurality of power storage devices. Therefore, a plurality of sets in which the AC/DC converter and the power storage device are connected in series are provided. Among said plurality of sets of AC/DC converter and the power storage device, the load amount is adjusted by changing the number of sets to which power is supplied from the test target power supply (power supply device such as first power generation device 11) via the control device 13.

(Portable Power Storage Unit 18)

The portable power storage unit 18 includes the holding unit 18*a* and the portable power storage device 18*b*.

The holding unit 18*a* holds the portable power storage device 18*b* in a detachable state.

The portable power storage device 18*b* is a power storage device that accumulates power from the first power generation device 11 and the like.

The portable power storage device 18*b* is detachable from the holding unit 18*a*, is detachably attached to other electric device such as the second electric vehicle c2 described later, and drives said other electric device.

When the power supply from the first power generation device 11 is not sufficient, the portable power storage device 18*b* supplies the accumulated power to the load (the first load 19*a* to the fourth load 19*d*) and the like via the control device 13.

In addition, power may be accumulated in the portable power storage device 18*b* not only in the first power and hydrogen supply station 10*a* but also outside the first power and hydrogen supply station 10*a*.

For example, it is conceivable that the portable power storage device 18*b* mounted on the first load test mobile device t1 together with the rechargeable load test device LB1 accumulates power supplied from the first test target power supply G1 via the rechargeable load test device LB1 (see FIG. 3).

The rechargeable load test device LB1 performs a load test of the first test target power supply G1 by charging the portable power storage device 18*b* with power from the first test target power supply G1.

In addition, it is conceivable that the portable power storage device 18*b* is held by the holding unit 18*a* of the second power and hydrogen supply station 10*b*, and accumulates power supplied from the first power generation device 11 or the like of the second power and hydrogen supply station 10*b*.

In the first embodiment, an example in which three holding units 18*a* are provided and three portable power storage devices 18*b* can be charged at the same time is shown, but the number of holding units 18*a* provided is not limited to three.

The holding unit 18*a* of the portable power storage unit 18 is installed inside the building 25 or the like.

The second conversion device 13*b* and the portable power storage unit 18 may be used as a rechargeable load test area for performing a load test of the power supply device such as the first power generation device 11.

In this case, at least one of the second conversion device 13*b* and the portable power storage unit 18 has a second variable structure for adjusting the load amount when performing the rechargeable load test.

For example, as said second variable structure, the portable power storage unit 18 includes a plurality of portable power storage devices 18*b*. The plurality of portable power storage devices 18*b* are connected in parallel and connected to one AC/DC converter of the second conversion device 13*b*. Among said plurality of portable power storage devices 18*b*, the load amount is adjusted by changing the number of the portable power storage devices 18*b* to which power is supplied from the test target power supply (power supply device such as the first power generation device 11) via the control device 13 and the second conversion device 13*b*.

Furthermore, for example, as said second variable structure, the second conversion device 13*b* includes a plurality of AC/DC converters, and the portable power storage unit 18 includes a plurality of portable power storage devices 18b. Said plurality of AC/DC converters are connected in parallel. Said plurality of portable power storage devices 18b are connected in parallel. Each of said plurality of AC/DC converters is connected to said plurality of portable power storage devices 18b. Therefore, a plurality of sets in which the AC/DC converter and the portable power storage device 18b are connected in series are provided. Among said plurality of sets of AC/DC converter and the portable power storage devices 18b, the load amount is adjusted by changing the number of sets to which power is supplied from the test target power supply (power supply device such as the first power generation device 11) via the control device 13.

(First Load 19A to Fourth Load 19D)

The first load 19a to the fourth load 19d are electric devices provided inside the building 25 or near the building 25, such as a light bulb, an elevator, a refrigerator, an air conditioner, and a television.

Power is supplied to one of the first load 19a to the fourth load 19d operated to be turned on by the user via the control device 13.

At least one of the first load 19a to the fourth load 19d may be a load test device that performs a load test of a power supply device such as the first power generation device 11.

(Hydrogen Storage Unit 21)

The hydrogen storage unit 21 includes the electrolytic solution supply unit 21a including a water intake unit 21a1, the hydrogen generation device 21b, the heat retaining and cooling unit 21c, the hydrogen tank 21d, the communication pipe 21e, the detecting device 21f, and the hydrogen supply unit 21g.

The electrolytic solution supply unit 21a supplies an electrolytic solution such as water for electrolysis to the hydrogen generation device 21b.

The electrolytic solution is collected by the water intake unit 21a1.

The water intake unit 21a1 is a dehumidifying device that condenses moisture in the air and collects the condensed water as an electrolytic solution.

The dehumidifying device includes, for example, a cooling plate, a heat sink, and a thermoelectric element (Peltier element) provided between the cooling plate and the heat sink.

In the first embodiment, the cooling plate is provided inside the building 25 to condense moisture contained in the air inside the building 25. However, the cooling plate may be provided outside the building 25 to condense moisture of air outside the building 25.

A portion of the air conditioner of the building 25 may function as said dehumidifying device, and water generated by condensation due to the operation of said air conditioner may be collected as the electrolytic solution.

In addition, the water intake unit 21a1 may be configured to collect rainwater from above the building 25, water stored around the building 25, and water of a river flowing said around the building.

Further, said dehumidifying device may be used for taking water contained in gas (oxygen, hydrogen) generated by electrolysis in hydrogen generation device 21b.

The hydrogen generation device 21b performs electrolysis based on power supplied from the first power generation device 11 or the like to generate hydrogen.

The electrolytic solution supply unit 21a and the hydrogen generation device 21b may be configured separately or integrally.

The hydrogen generation device 21b may be used as an electrolysis-type load test area in which a load test of a power supply device such as the first power generation device 11 is performed.

A load amount in the load test in the electrolysis-type load test area is adjusted by controlling the supply of the electrolytic solution from the electrolytic solution supply unit 21a to the hydrogen generation device 21b, controlling the movement of at least one of the electrodes in the hydrogen generation device 21b, controlling the movement of the insulator between one and the other of the electrodes in the hydrogen generation device 21b, and the like.

That is, at least one of the electrolytic solution supply unit 21a and the hydrogen generation device 21b has a third variable structure for adjusting the load amount when the electrolysis load test is performed.

For example, as said third variable structure, a plurality of at least one (for example, a cathode) of the electrodes is provided. Among said plurality of at least one of the electrodes, the load amount is adjusted by changing the number of cathodes through which the current from the test target power supply (for example, first power generation device 11) flows.

Figure 7:
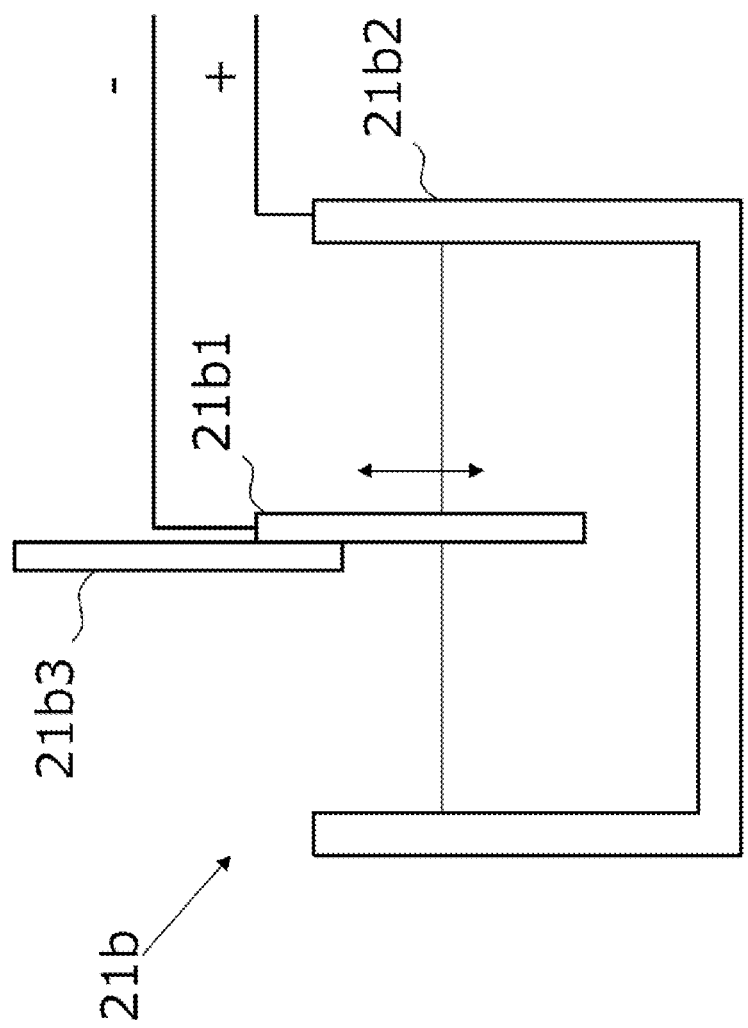
FIG. 7 is a diagram showing a configuration of a hydrogen generation device in which a load amount is adjusted by movement control of a cathode.

Further, for example, as said third variable structure, at least one (for example, cathode 21b1) of the electrodes is configured to be movable in a vertical direction. The load amount is adjusted by changing a contact area between at least one of the electrodes movable in the vertical direction and the electrolytic solution (electrode movement control, see FIG. 7). FIG. 7 shows an example in which a container holding an electrolytic solution constitutes an anode 21b2, the cathode 21b1 is provided inside the container, and the cathode 21b1 is held by a holding mechanism 21b3 in a vertically movable state, that is, in a state in which the contact area with the electrolytic solution is variable.

Further, for example, as said third variable structure, it is configured such that the amount of the electrolytic solution supplied to the hydrogen generation device 21b is adjusted. The load amount is adjusted by changing the amount of said electrolytic solution to change the contact area between the electrode and the electrolytic solution (electrolytic solution supply control).

Figure 8:
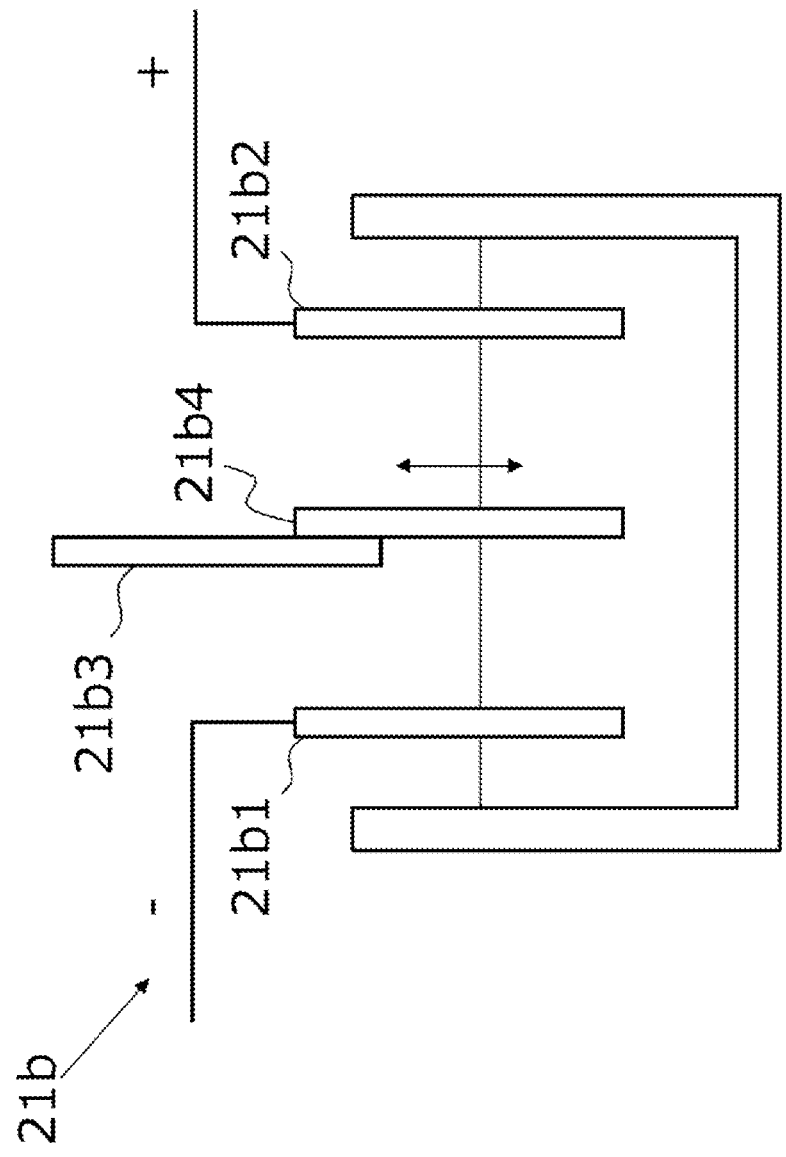
FIG. 8 is a diagram showing a configuration of a hydrogen generation device in which a load amount is adjusted by movement control of an insulator.

Furthermore, for example, as said third variable structure, an insulator 21b4 configured to be movable between one (for example, cathode 21b1) of the electrodes and the other (for example, anode 21b2) of the electrodes is provided. The load amount is adjusted by changing a degree of shielding between the electrodes by said insulator 21b4 (insulator movement control, see FIG. 8). FIG. 8 shows an example in which the cathode 21b1 and the anode 21b2 are provided inside a container that holds an electrolytic solution, the insulator 21b4 is provided between the cathode 21b1 and the anode 21b2, and the insulator 21b4 is held in a state of being movable in the vertical direction by the holding mechanism 21b3.

The third variable structure facilitates fine adjustment of the load amount as compared with the rechargeable load test area. Therefore, the rechargeable load test area is used for adjustment of a large load amount, and the electrolysis-type load test area is used for adjustment of a small load amount.

The heat retaining and cooling unit 21c holds the hydrogen tank 21d in a detachable state, and heats or cools the held hydrogen tank 21d.

Specifically, when occluding hydrogen generated by the hydrogen generation device 21b, the heat retaining and cooling unit 21c cools the hydrogen tank 21d held by itself.

When hydrogen is released from the hydrogen tank 21d, the heat retaining and cooling unit 21c heats the hydrogen tank 21d held by itself or stops cooling.

However, as described in a fourth embodiment to be described later, the hydrogen tank 21d may be heated by using heat obtained by a device different from the heat retaining and cooling unit 21c, such as a solar water heater 20.

The hydrogen tank 21d includes the hydrogen storage alloy that occludes hydrogen and a container that holds said hydrogen storage alloy. Said container of the hydrogen tank 21d holds the hydrogen storage alloy therein. The hydrogen tank 21d occludes hydrogen under a high pressure or a low temperature, and releases the occluded hydrogen when not in a state under the high pressure or the low temperature.

The hydrogen tank 21d communicates with the second power generation device 12, the hydrogen generation device 21b, and the hydrogen supply unit 21g via the communication pipe 21e.

Moisture (such as drain water) contained in a gas in such as the hydrogen generation device 21b, the hydrogen tank 21d, and the communication pipe 21e may be supplied to the electrolytic solution supply unit 21a as shown in the fourth embodiment described later.

At least one of the hydrogen tank 21d and the communication pipe 21e is provided with the detecting device 21f such as the strain sensor or the flow rate sensor.

The detecting device 21f is used to calculate the hydrogen filling degree (hydrogen filling rate R3) of the hydrogen tank 21d.

In the first embodiment, the hydrogen tank 21d is described as being portable, detachable from the heat retaining and cooling unit 21c, and mountable on the fourth electric vehicle c4 and the second load test mobile device t2 described later. However, at least one of the hydrogen tanks 21d may be configured to be fixed to the heat retaining and cooling unit 21c or the like without considering attachment and detachment.

In the first embodiment, a form in which the hydrogen tank 21d accumulates hydrogen by occluding the hydrogen in the storage alloy will be described. However, the hydrogen tank 21d may be configured to accumulate any of organic hydride containing hydrogen, hydrogen in a liquefied state, and hydrogen in a compressed gas state.

The hydrogen supply unit 21g is detachably connected to the third electric vehicle c3 and the like, and supplies hydrogen from the hydrogen tank 21d and the like to an in-vehicle fixed hydrogen storage device 31c of the third electric vehicle c3.

In addition, a high-pressure hydrogen tank or the like may be detachably connected to the hydrogen supply unit 21g. In this case, hydrogen from the high-pressure hydrogen tank or the like may be supplied to the hydrogen tank 21d or the like.

The accumulation (occlusion) of hydrogen in the hydrogen tank 21d may be performed not only in the first power and hydrogen supply station 10a but also outside the first power and hydrogen supply station 10a.

For example, it is conceivable that the hydrogen tank 21d mounted on the second load test mobile device t2 together with the electrolytic load test device LB2 accumulates generated hydrogen from the second test target power supply G2 via the electrolytic load test device LB2 (see FIG. 3).

The electrolytic load test device LB2 electrolyzes an electrolytic solution such as water using power from the second test target power supply G2, and causes the hydrogen tank 21d to occlude hydrogen obtained by said electrolysis, thereby performing a load test of the second test target power supply G2.

In addition, it is conceivable that the hydrogen tank 21d is held by the heat retaining and cooling unit 21c of the second power and hydrogen supply station 10b, and accumulates hydrogen based on the supplied power from the first power generation device 11 or the like of the second power and hydrogen supply station 10b.

(Buffer Tank)

A buffer tank 21d1 that temporarily accumulates hydrogen may be provided between the hydrogen generation device 21b and the hydrogen tank 21d and between the hydrogen tank 21d and the hydrogen supply unit 21g in the communication pipe 21e.

(Pressure Reducing Device)

The communication pipe 21e may be provided with a pressure reducing device 21d2 for adjusting a pressure.

(Communication Unit 23)

The communication unit 23 transmits, to the server 100, position information of the first power and hydrogen supply station 10a including the communication unit 23, sales information, charging information of the portable power storage device 18b or the like attached to the holding unit 18a of the portable power storage unit 18, hydrogen filling rate information of the hydrogen tank 21d attached to the heat retaining and cooling unit 21c of the hydrogen storage unit 21, and the like.

Said charging information and said hydrogen filling rate information are transmitted to a first electric vehicle c1 described later or the like via the server 100.

The communication unit 23 receives, from the server 100, information regarding the reservation for purchase or replacement of the power accumulated in the fixed power storage unit 17 or the like, the charged portable power storage device 18b, the charged hydrogen tank 21d, hydrogen filled in the hydrogen tank 21d, and the like.

The communication unit 23 transmits the charging information of the fixed power storage unit 17, the charging information of the portable power storage device 18b attached to the holding unit 18a of the portable power storage unit 18, the hydrogen filling rate information of the hydrogen tank 21d attached to the heat retaining and cooling unit 21c of the hydrogen storage unit 21, the information on the use priority of the power supply devices (first power generation device 11, second power generation device 12, fixed power storage unit 17, portable power storage unit 18), and the like to a portable terminal of a user of the first power and hydrogen supply station 10a, and the like.

(Building 25)

The building 25 is a building in which first load 19a and the like are installed.

(First Electric Vehicle c1)

The first electric vehicle c1 is a vehicle driven by power supplied via the charger 14, such as an automobile, a motorcycle, a ship, or an airborne device.

The first electric vehicle c1 includes the in-vehicle power storage device 31a, a first communication unit 33a, and a first display unit 35a.

(In-Vehicle Power Storage Device 31a)

The in-vehicle power storage device 31a accumulates power supplied from the fixed power storage unit 17 and the like via the first converter 14a of the charger 14.

The power accumulated in the in-vehicle power storage device 31a is supplied to a motor (not shown) of the first electric vehicle c1, the first communication unit 33a, the first display unit 35a, and the like.

The power supply to the in-vehicle power storage device 31a may be performed not only from the fixed power storage unit 17 but also from another power supply device (first power generation device 11, second power generation device 12, portable power storage device 18b).

In addition, the in-vehicle power storage device 31a supplies power to the fixed power storage unit 17 and the like via the second converter 14b of the charger 14.

(First Communication Unit 33a)

The first communication unit 33a transmits the position information of the first electric vehicle c1 and the like to the server 100.

The first communication unit 33a receives, from the server 100, charging information and the like of the fixed power storage unit 17 in each of the first power and hydrogen supply station 10a to the third power and hydrogen supply station 10c.

(First Display Unit 35a)

The first display unit 35a displays charging information including business hours of each of the first power and hydrogen supply station 10a to the third power and hydrogen supply station 10c, the time required from the current position of the first electric vehicle c1, the charging status of the fixed power storage unit 17, availability of reservation, and the like (see FIG. 5).

Said charging information includes a reservation instruction button 35a1 when it is possible to make a reservation for purchase of the power from the charged fixed power storage unit 17 among the first power and hydrogen supply station 10a to the third power and hydrogen supply station 10c.

When a predetermined first operation such as touching the reservation instruction button 35a1 is performed, information regarding the reservation is transmitted to the power and hydrogen supply station corresponding to said reservation instruction button 35a1 via the server 100, or call origination is performed.

The transmission of the information related to the reservation includes transmission of user information of the first electric vehicle c1 or information of the first electric vehicle c1, an expected arrival time, purchase of electric power, and the like.

In a case where call origination is performed, after a call via the first communication unit 33a is started, a call between the user of the first electric vehicle c1 and the user of the corresponding power and hydrogen supply station is performed.

Said charging information includes route guide buttons 35a2 from the current position of the first electric vehicle c1 to each of the first power and hydrogen supply station 10a to the third power and hydrogen supply station 10c.

When a predetermined second operation such as touching the route guide button 35a2 is performed, a route Ru from the current position of the first electric vehicle c1 to the power and hydrogen supply station corresponding to said route guide button 35a2 is displayed.

Said route Ru may be a route calculated with the power and hydrogen supply station corresponding to said route guide button 35a2 as a final destination Dp, or, when a route to another destination is set before the second operation is performed, the route Ru may be a route Ru calculated with said another destination as the final destination and the power and hydrogen supply station corresponding to said route guide button 35a2 as a transit point.

Figure 6:
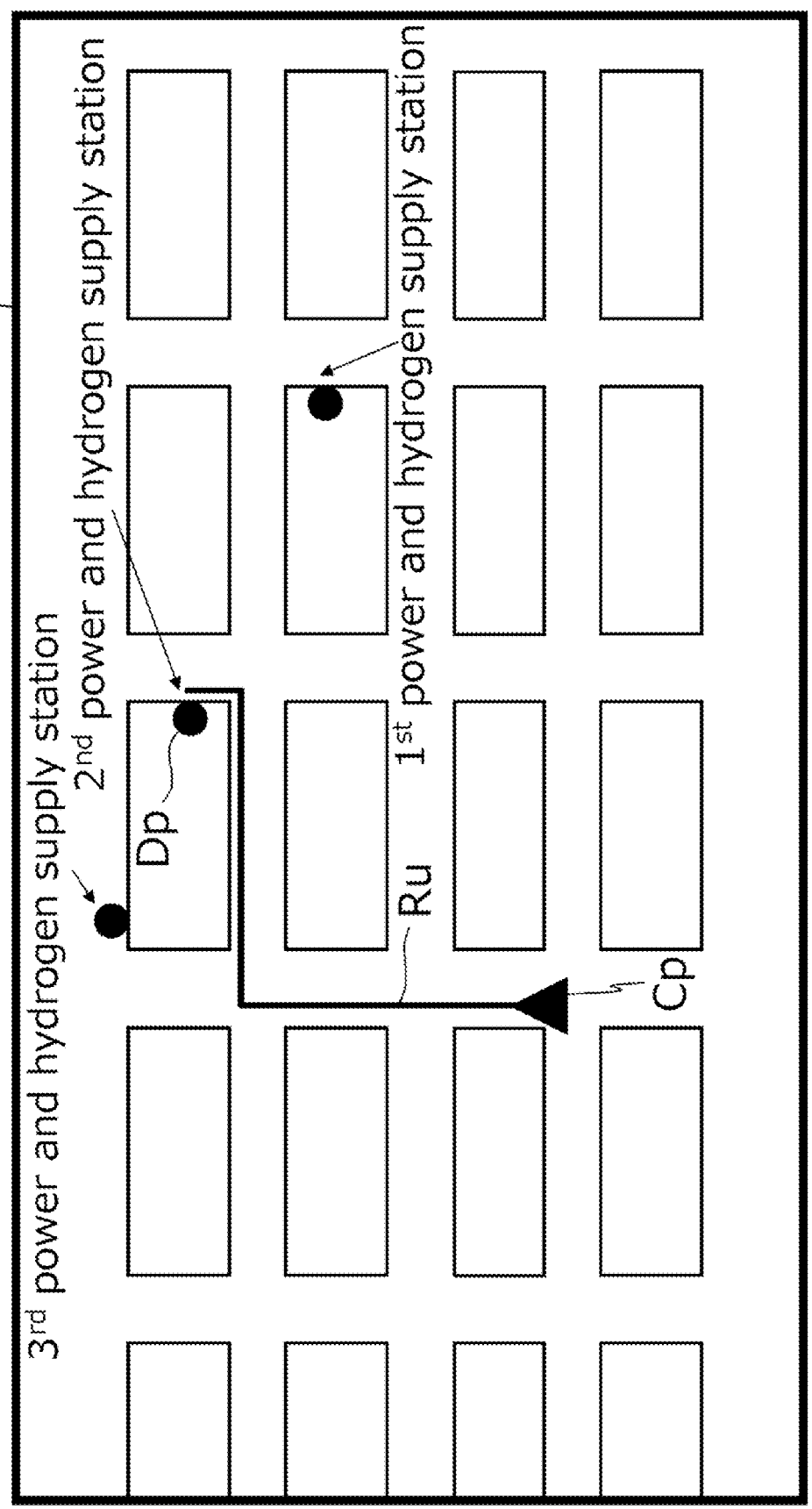
FIG. 6 is an example of a route displayed by the first display unit.

When the first operation is performed, the route Ru to the power and hydrogen supply station corresponding to said reservation instruction button 35a1 may be displayed (see FIG. 6).

FIG. 6 shows an example in which a reservation for purchase or replacement of the portable power storage device 18b is made in the second power and hydrogen supply station 10b in a state where a route to another destination is not set before the first operation is performed, and the route Ru from the current position Cp is displayed on the first display unit 35a with the second power and hydrogen supply station 10b as the final destination Dp.

Arithmetic processing related to the display of the first display unit 35a, such as the calculation of the route, may be performed by the control unit of the first electric vehicle c1 or may be performed by the server 100.

Said charging information may include all the power and hydrogen supply stations, but may be configured to include only those within a range of a first distance dl from the current position of the first electric vehicle c1 and/or only those within the range of the first distance dl from the route when the first electric vehicle c1 sets the route.

In addition, said charging information may be displayed in a state in which the power and hydrogen supply stations are arranged in the order of a shortest straight line or a shortest way from the current position of the first electric vehicle c1, and in the order of a shortest straight line or a shortest way from the route when the first electric vehicle c1 sets the route.

In addition, among the first power and hydrogen supply station 10a to the third power and hydrogen supply station 10c, only said charging information meeting specific conditions such as the charging information corresponding to the one having the charged fixed power storage unit 17, the charging information corresponding to the one for which purchase can be reserved, and the charging information corresponding to the one for which the time required from the current position is short, or the like may be displayed.

(Second Electric Vehicle c2)

The second electric vehicle c2 is a vehicle that holds the portable power storage device 18b and is driven by the power of the held portable power storage device 18b, such as an automobile, a motorcycle, a ship, or an airborne device.

The second electric vehicle c2 includes a portable power storage device holding unit 31b, a second communication unit 33b, and a second display unit 35b.

(Portable Power Storage Device Holding Unit 31b)

The portable power storage device 18b is detachably attached to the portable power storage device holding unit 31b.

The power accumulated in the portable power storage device 18b is supplied to a motor (not shown) of the second electric vehicle c2, the second communication unit 33b, the second display unit 35b, and the like via the portable power storage device holding unit 31b.

(Second Communication Unit 33b)

The second communication unit 33b transmits the position information of the second electric vehicle c2 and the like to the server 100.

The second communication unit 33b receives, from the server 100, the charging information and the like of the portable power storage device 18b in each of the first power and hydrogen supply station 10a to the third power and hydrogen supply station 10c.

(Second Display Unit 35b)

The second display unit 35b displays charging information including the business hours of each of the first power and hydrogen supply station 10a to the third power and hydrogen supply station 10c, the time required from the current position of the second electric vehicle c2, the charging status of the portable power storage device 18b, availability of reservation, and the like (not shown).

When each of the first power and hydrogen supply station 10a to the third power and hydrogen supply station 10c is charging a plurality of types of portable power storage devices 18b, only information related to those corresponding to the portable power storage device holding unit 31b of the second electric vehicle c2 among said plurality of types of portable power storage devices 18b is desirably displayed as said charging information.

Said charging information displays a reservation instruction button when, among the first power and hydrogen supply station 10a to the third power and hydrogen supply station 10c, purchase of the charged portable power storage device 18b or replacement with the portable power storage device 18b held by the second electric vehicle c2, or the like can be reserved.

When a predetermined first operation such as touching the reservation instruction button on the second display unit 35b is performed, information regarding the reservation is transmitted to the power and hydrogen supply station corresponding to said reservation instruction button via the server 100, or call origination is performed.

The transmission of the information related to the reservation includes transmission of user information of the second electric vehicle c2 or information of the second electric vehicle c2, an expected arrival time, a type of the portable power storage device 18b to be purchased or replaced, and the like.

In a case where call origination is performed, after a call via the second communication unit 33b is started, a call between the user of the second electric vehicle c2 and the user of the corresponding power and hydrogen supply station is performed.

Said charging information includes route guide buttons from the current position of the second electric vehicle c2 to each of the first power and hydrogen supply station 10a to the third power and hydrogen supply station 10c.

When a predetermined second operation such as touching the route guide button on the second display unit 35b is performed, the route Ru from the current position of the second electric vehicle c2 to the power and hydrogen supply station corresponding to said route guide button is displayed.

Said route Ru may be a route calculated with the power and hydrogen supply station corresponding to said route guide button as a final destination Dp, or when a route to another destination is set before the second operation is performed, the route Ru may be a route Ru calculated with said another destination as the final destination and the power and hydrogen supply station corresponding to said route guide button as a transit point.

When the first operation is performed, the route Ru to the power and hydrogen supply station corresponding to said reservation instruction button may be displayed (not shown).

Arithmetic processing related to the display of the second display unit 35b, such as the calculation of the route, may be performed by the control unit of the second electric vehicle c2 or may be performed by the server 100.

Said charging information may include all the power and hydrogen supply stations, but may be configured to include only those within the range of the first distance dl from the current position of the second electric vehicle c2 and/or only those within the range of the first distance dl from the route when the second electric vehicle c2 sets the route.

In addition, said charging information may be displayed in a state in which the power and hydrogen supply stations are arranged in the order of a shortest straight line or a shortest way from the current position of the second electric vehicle c2, and in the order of a shortest straight line or a shortest way from the route when the second electric vehicle c2 sets the route.

In addition, among the first power and hydrogen supply station 10a to the third power and hydrogen supply station 10c, only said charging information meeting specific conditions such as the charging information corresponding to the one having the charged portable power storage device 18b, the charging information corresponding to the one for which purchase or replacement can be reserved, and the charging information corresponding to the one for which the required time from the current position is short, or the like may be displayed.

(Third Electric Vehicle c3)

The third electric vehicle c3 is a vehicle driven by power based on hydrogen supplied via the hydrogen supply unit 21g, such as an automobile, a motorcycle, a ship, or an airborne device.

The third electric vehicle c3 includes the in-vehicle fixed hydrogen storage device 31c, a third communication unit 33c, and a third display unit 35c.

(In-Vehicle Fixed Hydrogen Storage Device 31c)

The in-vehicle fixed hydrogen storage device 31c accumulates hydrogen supplied from the hydrogen tank 21d and the like via the hydrogen supply unit 21g. The in-vehicle fixed hydrogen storage device 31c is fixed at a predetermined position inside the third electric vehicle c3 without considering attachment and detachment.

The hydrogen accumulated in the in-vehicle fixed hydrogen storage device 31c is converted into power by the fuel cell (not shown).

The power converted by said fuel cell is supplied to a motor (not shown) of the third electric vehicle c3, the third communication unit 33c, the third display unit 35c, and the like.

Hydrogen may be supplied to the in-vehicle fixed hydrogen storage device 31c not only from one hydrogen tank 21d but also from another hydrogen supply device (another hydrogen tank 21d, hydrogen generation device 21b).

(Third Communication Unit 33c)

The third communication unit 33c transmits the position information of the third electric vehicle c3 and the like to the server 100.

The third communication unit 33c receives, from the server 100, hydrogen filling information and the like of the hydrogen tank 21d in each of the first power and hydrogen supply station 10a to the third power and hydrogen supply station 10c.

(Third Display Unit 35c)

The third display unit 35c displays hydrogen filling information including the business hours of each of the first power and hydrogen supply station 10a to the third power and hydrogen supply station 10c, the time required from the current position of the third electric vehicle c3, the hydrogen filling status of the hydrogen tank 21d, availability of reservation, and the like (not shown).

Said hydrogen filling information includes a reservation instruction button when it is possible to make a reservation for purchase of hydrogen from the hydrogen tank 21d filled with hydrogen among the first power and hydrogen supply station 10a to the third power and hydrogen supply station 10c.

When a predetermined first operation such as touching the reservation instruction button on the third display unit 35c is performed, information regarding the reservation is transmitted to the power supply device corresponding to said reservation instruction button via the server 100, or call origination is performed.

The transmission of the information related to the reservation includes transmission of user information of the third electric vehicle c3 or information of the third electric vehicle c3, an expected arrival time, purchase of hydrogen, and the like.

In a case where call origination is performed, after a call via the third communication unit 33c is started, a call between the user of the third electric vehicle c3 and the user of the corresponding power and hydrogen supply station is performed.

Said hydrogen filling information includes route guide buttons from the current position of the third electric vehicle c3 to each of the first power and hydrogen supply station 10a to the third power and hydrogen supply station 10c.

When a predetermined second operation such as touching the route guide button on the third display unit 35c is performed, the route Ru from the current position of the third electric vehicle c3 to the power and hydrogen supply station corresponding to said route guide button is displayed.

Said route Ru may be a route calculated with the power and hydrogen supply station corresponding to said route guide button as a final destination Dp, or when a route to another destination is set before the second operation is performed, the route Ru may be a route Ru calculated with said another destination as the final destination and the power and hydrogen supply station corresponding to said route guide button as a transit point.

When the first operation is performed, the route Ru to the power and hydrogen supply station corresponding to said reservation instruction button may be displayed (not shown).

Arithmetic processing related to the display of the third display unit 35c, such as the calculation of the route, may be performed by the control unit of the third electric vehicle c3 or may be performed by the server 100.

Said hydrogen filling information may include all the power and hydrogen supply stations, but may be configured to include only those within the range of the first distance dl from the current position of the third electric vehicle c3 and/or only those within the range of the first distance dl from the route when the third electric vehicle c3 sets the route.

In addition, said hydrogen filling information may be displayed in a state in which the power and hydrogen supply stations are arranged in the order of a shortest straight line or a shortest way from the current position of the third electric vehicle c3, and in the order of a shortest straight line or a shortest way from the route when the third electric vehicle c3 sets the route.

In addition, among the first power and hydrogen supply station 10a to the third power and hydrogen supply station 10c, only said hydrogen filling information meeting specific conditions such as the hydrogen filling information corresponding to the hydrogen tank 21d already filled with hydrogen, the hydrogen filling information corresponding to the hydrogen filling information for which purchase can be reserved, and the hydrogen filling information corresponding to the hydrogen filling information for which the required time from the current position is short, or the like may be displayed.

(Fourth Electric Vehicle c4)

The fourth electric vehicle c4 is a vehicle that holds the hydrogen tank 21d and is driven by power based on hydrogen in the held hydrogen tank 21d, such as an automobile, a motorcycle, a ship, or an airborne device.

The fourth electric vehicle c4 includes a hydrogen tank holding unit 31d, a fourth communication unit 33d, and a fourth display unit 35d.

(Hydrogen Tank Holding Unit 31d)

The hydrogen tank 21d is detachably attached to the hydrogen tank holding unit 31d.

Hydrogen accumulated in the hydrogen tank 21d is converted into power by the fuel cell (not shown).

The power converted by said fuel cell is supplied to a motor (not shown) of the fourth electric vehicle c4, the fourth communication unit 33d, the fourth display unit 35d, and the like.

(Fourth Communication Unit 33d)

The fourth communication unit 33d transmits the position information of the fourth electric vehicle c4 and the like to the server 100.

The fourth communication unit 33d receives, from the server 100, the hydrogen filling information of the hydrogen tank 21d in each of the first power and hydrogen supply station 10a to the third power and hydrogen supply station 10c.

(Fourth Display Unit 35d)

The fourth display unit 35d displays charging information including the business hours of each of the first power and hydrogen supply station 10a to the third power and hydrogen supply station 10c, the time required from the current position of the fourth electric vehicle c4, the hydrogen filling status of the hydrogen tank 21d, availability of reservation, and the like (not shown).

When each of the first power and hydrogen supply station 10a to the third power and hydrogen supply station 10c fills a plurality of types of hydrogen tanks 21d with hydrogen, only information related to those corresponding to the hydrogen tank holding unit 31d of the fourth electric vehicle c4 among said plurality of types of hydrogen tanks 21d is desirably displayed as said hydrogen filling information.

Said hydrogen filling information includes a reservation instruction button when, among the first power and hydrogen supply station 10a to the third power and hydrogen supply station 10c, the purchase of the hydrogen tank 21d filled with hydrogen or the replacement with the hydrogen tank 21d held by the fourth electric vehicle c4, or the like can be reserved.

When a predetermined first operation such as touching a reservation instruction button on the fourth display unit 35d is performed, information regarding the reservation is transmitted to the power and hydrogen supply station corresponding to said reservation instruction button via the server 100, or call origination is performed.

The transmission of the information related to the reservation includes transmission of user information of the fourth electric vehicle c4 or information of the fourth electric vehicle c4, an expected arrival time, a type of the hydrogen tank 21d to be purchased or replaced, and the like.

In a case where call origination is performed, after a call via the fourth communication unit 33d is started, a call between the user of the fourth electric vehicle c4 and the user of the corresponding power and hydrogen supply station is performed.

Said hydrogen filling information includes route guide buttons from the current position of the fourth electric vehicle c4 to each of the first power and hydrogen supply station 10a to the third power and hydrogen supply station 10c.

When a predetermined second operation such as touching the route guide button on the fourth display unit 35d is performed, the route Ru from the current position of the fourth electric vehicle c4 to the power and hydrogen supply station corresponding to said route guide button is displayed.

Said route Ru may be a route calculated with the power and hydrogen supply station corresponding to said route guide button as a final destination Dp, or when a route to another destination is set before the second operation is performed, the route Ru may be a route Ru calculated with said another destination as the final destination and the power and hydrogen supply station corresponding to said route guide button as a transit point.

When the first operation is performed, the route Ru to the power and hydrogen supply station corresponding to said reservation instruction button may be displayed (not shown).

Arithmetic processing related to the display of the fourth display unit 35d, such as the calculation of the route, may be performed by the control unit of the fourth electric vehicle c4 or may be performed by the server 100.

Said hydrogen filling information may include all the power and hydrogen supply stations, but may be configured to include only those within the range of the first distance dl from the current position of the fourth electric vehicle c4 and/or only those within the range of the first distance dl from the route when the fourth electric vehicle c4 sets the route.

In addition, said hydrogen filling information may be displayed in a state in which the power and hydrogen supply stations are arranged in the order of a shortest straight line or a shortest way from the current position of the fourth electric vehicle c4, and in the order of a shortest straight line or a shortest way from the route when the fourth electric vehicle c4 sets the route.

In addition, among the first power and hydrogen supply station 10a to the third power and hydrogen supply station 10c, only said hydrogen filling information meeting specific conditions such as the hydrogen filling information corresponding to the one having the hydrogen tank 21d already filled with hydrogen, the hydrogen filling information corresponding to the one for which purchase or replacement can be reserved, and the hydrogen filling information corresponding to the one for which the required time from the current position is short, or the like may be displayed.

(Server 100)

The server 100 communicates with the first power and hydrogen supply station 10a to the third power and hydrogen supply station 10c and the first electric vehicle c1 to the fourth electric vehicle c4 via a network.

Figure 10:
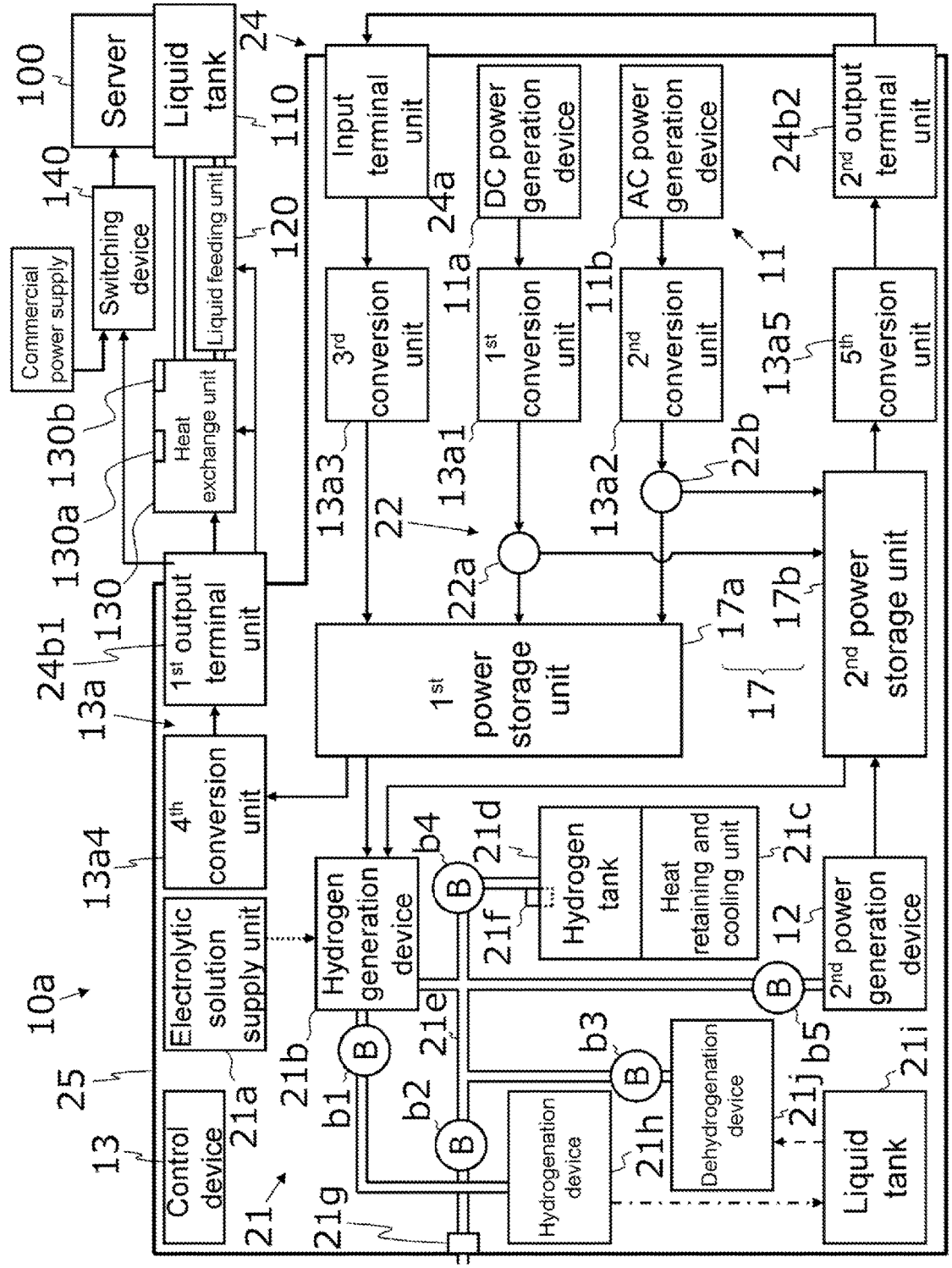
FIG. 10 is a block diagram of a cooling device (a power and supply station and a heating medium circulating device) according to a third embodiment.

As will be described later, when the server 100 is disposed adjacent to the first power and hydrogen supply station 10a, the server 100 may be cooled on the basis of the power supplied from the first power and hydrogen supply station 10a (see FIG. 10).

(Operation Procedure of Load Test)

When the load test of the first power generation device 11 is performed, the second power generation device 12 is turned off, and power is supplied from the first power generation device 11 to the fixed power storage unit 17, the portable power storage unit 18, and the hydrogen generation device 21b.

When the load test of the second power generation device 12 is performed, the first power generation device 11 is turned off, and power is supplied from the second power generation device 12 to the fixed power storage unit 17, the portable power storage unit 18, and the hydrogen generation device 21b. Note that, when the second power generation device 12 is used for purposes other than the load test, the operation is controlled such that power is not supplied from the second power generation device 12 to the hydrogen generation device 21b.

In a case where the load test of the external test target power supply connected to the first power and hydrogen supply station 10a is performed, said external test target power supply is connected to the control device 13, the first power generation device 11 and the second power generation device 12 are turned off, and power is supplied from said external test target power supply to the fixed power storage unit 17, the portable power storage unit 18, and the hydrogen generation device 21b.

(Effects of Using Power Storage Device, Hydrogen Storage Unit, and Plurality of Power Generation Devices)

By using the first power generation device 11 and the second power generation device 12, in a time zone in which power generation by the first power generation device 11 is possible, power and hydrogen are accumulated by power generation using the first power generation device 11. In a time zone in which power generation by the first power generation device 11 is not possible, an electric device such as the first load 19a and the first electric vehicle c1 is driven using power from the second power generation device 12 and the power storage unit (fixed power storage unit 17, portable power storage unit 18).

The first power generation device 11 generates power based on natural energy, and the second power generation device 12 generates power based on hydrogen. Moreover, the hydrogen obtained in the hydrogen storage unit 21 is used as the hydrogen used in the second power generation device 12.

Therefore, even when there is no power supply from the outside, it is possible to obtain power and hydrogen in the first power and hydrogen supply station 10a and accumulate them.

In the power accumulated in power storage unit (fixed power storage unit 17, portable power storage unit 18), there is a possibility that the accumulated power decreases due to discharging.

The hydrogen accumulated in the hydrogen tank 21d of the hydrogen storage unit 21 is less likely to be spontaneously released.

Therefore, the power obtained by first power generation device 11 can be efficiently accumulated by using the power storage in the power storage unit (fixed power storage unit 17, portable power storage unit 18) for the short period storage and using the hydrogen occlusion in the hydrogen tank 21d for the long period storage.

The present invention also corresponds to a form of directly supplying power, a form of directly supplying hydrogen, a form of supplying the portable power storage unit 18, a form of supplying a container (portable hydrogen tank 21d) containing hydrogen, and the like, to the electric device. It can supply power and hydrogen to various forms of the electric device.

In addition, by using water obtained based on moisture in the air as an electrolytic solution, it is possible to continuously accumulate hydrogen even in a state where supply of members from the outside is small.

(Effects of Using Power Storage Device and Hydrogen Generation Device as Load Test Area)

Using both the power storage device (such as the fixed power storage unit 17) and the hydrogen storage device (such as the hydrogen generation device 21b) in the first power and hydrogen supply station 10a, it is possible to perform a load test of the power generation device (such as the first power generation device 11) with a large load and a small load. Since the power generated during the load test can be accumulated as power or hydrogen, energy loss is small.

(Effect of Using Electrolysis-Type Load Test Area for Fine Adjustment of Load)

By controlling the movement of the electrolysis electrode or the like or the supply of the electrolytic solution, it is possible to adjust a minute load amount as compared with the control of switching the number of power storage devices to be used in the rechargeable load test area.

(Effect of Adjustment of Use Priority)

Even in a time zone in which power generation by the first power generation device 11 is not possible, power can be supplied using a plurality of power supply devices, that is, the power storage unit (fixed power storage unit 17, portable power storage unit 18) and the second power generation device 12. Meanwhile, the power supply device to be required and the power supply device to be actually used may not match. By setting the optimum use priority, it is possible to efficiently use the accumulated power and hydrogen.

(Effect of Determining Use Priority by Control Device 13 Based on Use State of Power Storage Unit or The Like)

By maintaining a frequency of use of the fixed power storage unit 17 and the portable power storage unit 18 at a certain level or more, loss due to natural discharge can be reduced. In addition, by maintaining a frequency of use of the second power generation device 12 at a certain level or more, it is possible to reduce the possibility of deterioration of the second power generation device 12 due to non-use and the possibility of deterioration due to excessive charge and discharge of the fixed power storage unit 17 and the portable power storage unit 18.

(Effect of Using Strain Sensor)

By using a strain sensor that measures strain as the detecting device 21f, the hydrogen filling degree can be obtained from the degree of strain of the hydrogen storage alloy expanded by occlusion, and it is possible to obtain an accurate hydrogen filling degree as compared with a form in which the degree of hydrogen filling is calculated on the basis of the flow rate of hydrogen or the like flowing into the hydrogen tank 21d.

(Effect of Directly Supplying Hydrogen or the Like to Electric Device)

The power storage unit can supply power to an electric device of a type that directly charges a battery of a vehicle, such as a plug-in hybrid car (first electric vehicle c1), via a cable. The hydrogen tank 21d or the like can fill hydrogen via a flexible tube or the like in an electric device of a type that directly fills hydrogen in the in-vehicle fixed hydrogen storage device 31c of a vehicle, such as a fuel cell vehicle (third electric vehicle c3).

(Effect of Using Power Obtained in Load Test)

Using the power obtained by the load test of the test target power supply, it is possible to accumulate electricity in the portable power storage device 18b and fill the portable hydrogen tank 21d with hydrogen.

(Effect of Notifying Charging Status)

In the first electric vehicle c1 using the power accumulated in the in-vehicle power storage device 31a, it is desirable to be able to obtain information such as a store where power can be purchased from the charged fixed power storage unit 17 or the like.

The charging information including the charging status and the like of the fixed power storage unit 17 is displayed on the first display unit 35a of the first electric vehicle c1 using the in-vehicle power storage device 31a.

As a result, the user of the first electric vehicle c1 can visually recognize a store (power and hydrogen supply station) that handles purchasable power near the first electric vehicle c1.

(Effect of Notification of Charging Status of Plurality of Power and Hydrogen Supply Stations)

By notifying a plurality of pieces of information of the stores (power and hydrogen supply stations) that handle the purchasable power, it is possible to bring about a situation where the user of the first electric vehicle c1 can easily select an optimal store.

By showing the route Ru to the selected store (power and hydrogen supply station), it is possible to easily move to the store.

(Effect of Notifying Charging Status)

In the second electric vehicle c2 using the portable power storage device 18b, it is desirable to be able to obtain information such as a store where the charged portable power storage device 18b can be purchased.

The charging information including a charging status of the portable power storage device 18b and the like is displayed on the second display unit 35b of the second electric vehicle c2 using the portable power storage device 18b.

As a result, the user of the second electric vehicle c2 can visually recognize a store (power and hydrogen supply station) that handles the portable power storage device 18b that can be purchased or replaced near the second electric vehicle c2.

(Effect of Notification of Charging Status of Plurality of Power and Hydrogen Supply Stations)

By notifying a plurality of pieces of information of the stores (power and hydrogen supply stations) that handle the portable power storage devices 18b that can be purchased or replaced, it is possible to bring about a situation where the user of the second electric vehicle c2 can easily select an optimal store.

By showing the route Ru to the selected store (power and hydrogen supply station), it is possible to easily move to the store.

(Effect of Notification of Hydrogen Filling Status)

In the third electric vehicle c3 using hydrogen accumulated in the in-vehicle fixed hydrogen storage device 31c, it is desirable to be able to obtain information such as a store where purchase or the like of hydrogen is possible from the hydrogen tank 21d filled with hydrogen.

The hydrogen filling information including a hydrogen filling status of the hydrogen tank 21d and the like is displayed on the third display unit 35c of the third electric vehicle c3 using the in-vehicle fixed hydrogen storage device 31c.

As a result, the user of the third electric vehicle c3 can visually recognize a store (power and hydrogen supply station) that handles purchasable power near the third electric vehicle c3.

(Effect of Notification of Charging Status of Plurality of Power and Hydrogen Supply Stations)

By notifying a plurality of pieces of information of the stores (power and hydrogen supply stations) that handle purchasable hydrogen, it is possible to bring about a situation where the user of the third electric vehicle c3 can easily select an optimal store.

By showing the route Ru to the selected store (power and hydrogen supply station), it is possible to easily move to the store.

(Effect of Notification of Hydrogen Filling Status)

In the fourth electric vehicle c4 using the hydrogen tank 21d, it is desirable to be able to obtain information such as a store where purchase or the like of the hydrogen tank 21d filled with hydrogen is possible.

The hydrogen filling information including a hydrogen filling status of the hydrogen tank 21d and the like is displayed on the fourth display unit 35d of the fourth electric vehicle c4 using the hydrogen tank 21d.

As a result, the user of the fourth electric vehicle c4 can visually recognize a store (power and hydrogen supply station) that handles the hydrogen tank 21d that can be purchased or replaced near the fourth electric vehicle c4.

(Effect of Notification of Charging Status of Plurality of Power and Hydrogen Supply Stations)

By notifying the user of a plurality of pieces of information of the stores (power and hydrogen supply station) that handle the hydrogen tank 21d that can be purchased or replaced, it is possible to bring about a situation where the user of the fourth electric vehicle c4 can easily select an optimal store.

By showing the route Ru to the selected store (power and hydrogen supply station), it is possible to easily move to the store.

(Hydrogen Generation Device 21b is Not Limited to Electrolysis)

In the first embodiment, the hydrogen generation device 21b has been described as a device that generates hydrogen by electrolysis of an electrolytic solution.

However, the method for generating hydrogen is not limited to the electrolysis of the electrolytic solution.

For example, the hydrogen generation device 21b may be a device that heats an organic hydride that reversibly releases hydrogen as a catalytic reaction.

In this case, an organic hydride supply unit is provided instead of the electrolytic solution supply unit 21a.

(Application Example Of Power And Hydrogen Supply Station, Second Embodiment)

Next, a second embodiment will be described.

In a first power and hydrogen supply station 10a of the second embodiment, unlike the first power and hydrogen supply station 10a of the first embodiment, a fixed power storage unit 17 has two power storage units (first power storage unit 17a, second power storage unit 17b), and a hydrogen storage unit 21 has a hydrogen tank 21d, a liquid tank 21i that accumulates hydrogen as an organic hydride, and the like.

Hereinafter, differences from the first embodiment will be mainly described.

A second power and hydrogen supply station 10b and a third power and hydrogen supply station 10c of the second embodiment may have the same configurations as the first power and hydrogen supply station 10a of the second embodiment.

(First Power and Hydrogen Supply Station 10a)

Figure 9:
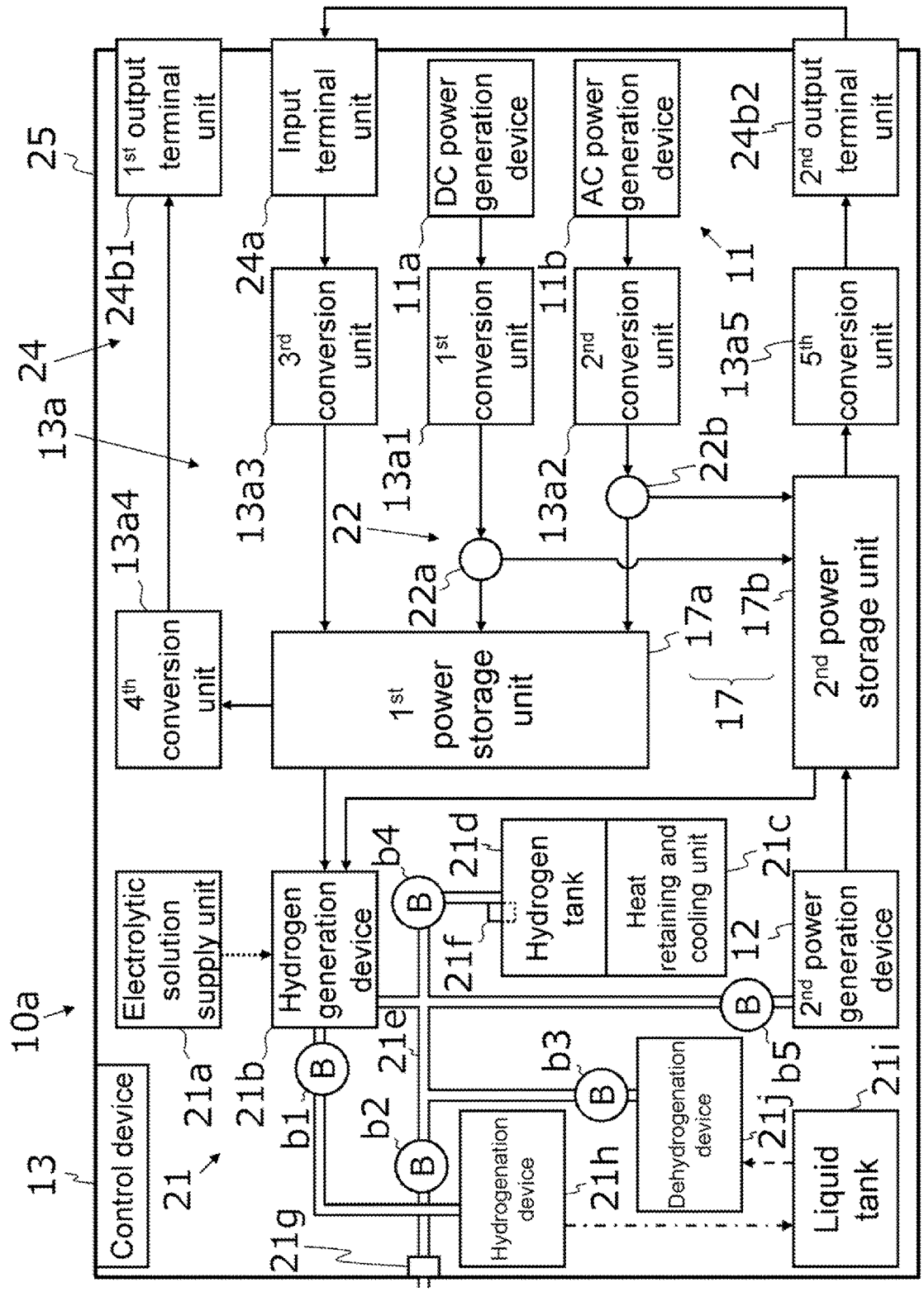
FIG. 9 is a block diagram showing a configuration of one of the power and hydrogen supply stations according to a second embodiment.

The first power and hydrogen supply station 10a of the second embodiment includes a first power generation device 11, a second power generation device 12, a control device 13, a first conversion device 13a, a fixed power storage unit 17, a hydrogen storage unit 21, a switching unit 22, and an input/output terminal unit 24 (see FIG. 9).

As in the first embodiment, the first power and hydrogen supply station 10a of the second embodiment may include a charger 14, a station-side display unit 15, a station-side operation unit 16, and a communication unit 23.

The switching unit 22 includes a first switching unit 22a and a second switching unit 22b.

(First Power Generation Device 11)

The first power generation device 11 of the second embodiment includes a DC power generation device 11a and an AC power generation device 11b.

(DC Power Generation Device 11a)

The DC power generation device 11a is a power generation device (first renewable energy-derived power generation device) that generates power based on natural energy (renewable energy), such as a solar power generation device.

The DC power generation device 11a is always in a state capable of generating power.

The DC power generation device 11a is installed on a rooftop of a building 25 or the like.

The power obtained by the DC power generation device 11a is supplied to the first power storage unit 17a and the second power storage unit 17b via a first conversion unit 13a1 and the first switching unit 22a.

(AC Power Generation Device 11b)

The AC power generation device 11b is a power generation device (second renewable energy-derived power generation device) that generates power on the basis of natural energy (renewable energy), such as a wind power generation device.

The AC power generation device 11b is always in a state capable of generating power.

However, in a case where the wind power received by the AC power generation device 11b exceeds the predetermined wind power, the AC power generation device 11b is brought into a state where power generation cannot be performed.

The AC power generation device 11b is installed on the rooftop of the building 25 or the like.

The power obtained by the AC power generation device 11b is supplied to the first power storage unit 17a and the second power storage unit 17b via the second conversion unit 13a2 and the second switching unit 22b.

(Second Power Generation Device 12)

The second power generation device 12 is a power generation device (fuel cell) that generates power based on hydrogen.

The second power generation device 12 is installed inside the building 25, on the rooftop of the building 25, or the like.

The power obtained by the second power generation device 12 is supplied to the second power storage unit 17b.

(First Conversion Device 13a)

The first conversion device 13a of the second embodiment includes the first conversion unit 13a1, the second conversion unit 13a2, a third conversion unit 13a3, a fourth conversion unit 13a4, and a fifth conversion unit 13a5.

(First Conversion Unit 13a1)

The first conversion unit 13a1 is provided between the DC power generation device 11a and the first power storage unit 17a. The first conversion unit 13a1 includes a power conditioner and a DC/DC converter. The power obtained by the DC power generation device 11a is converted into a predetermined voltage and a predetermined current by the first conversion unit 13a1, and is supplied to the first power storage unit 17a or the second power storage unit 17b.

(Second Conversion Unit 13a2)

The second conversion unit 13a2 is provided between the AC power generation device 11b and the first power storage unit 17a. The second conversion unit 13a2 includes a power conditioner and an AC/DC converter. The power obtained by the AC power generation device 11b is converted into a predetermined voltage and a predetermined current by the second conversion unit 13a2, and is supplied to the first power storage unit 17a or the second power storage unit 17b.

(Third Conversion Unit 13a3)

The third conversion unit 13a3 is provided between an input terminal unit 24a and the first power storage unit 17a. The third conversion unit 13a3 includes an AC/DC converter. The power from a power supply device (for example, second power storage unit 17b) connected to the input terminal unit 24a is converted into a predetermined voltage and a predetermined current by the third conversion unit 13a3, and is supplied to first power storage unit 17a.

(Fourth Conversion Unit 13a4)

The fourth conversion unit 13a4 is provided between the first power storage unit 17a and a first output terminal unit 24b1. The fourth conversion unit 13a4 includes a DC/AC inverter. The power accumulated in the first power storage unit 17a is converted into a predetermined voltage and a predetermined current by the fourth conversion unit 13a4, and is supplied to an electric device (for example, a load in the building 25, and the like) connected to a first output terminal unit 24b1.

(Fifth Conversion Unit 13a5)

The fifth conversion unit 13a5 is provided between the second power storage unit 17b and a second output terminal unit 24b2. The fifth conversion unit 13a5 includes a DC/AC inverter. The power accumulated in the second power storage unit 17b is converted into a predetermined voltage and a predetermined current by the fifth conversion unit 13a5, and is supplied to an electric device connected to a second output terminal unit 24b2.

(Another Conversion Unit)

Between the second power generation device 12 and the second power storage unit 17b, a conversion unit (such as a DC/DC converter) that converts the power obtained by the second power generation device 12 into a predetermined voltage and a predetermined current may be provided.

(Control Device 13)

The control device 13 controls the operation of each unit.

The control device 13 is installed inside the building 25 or the like.

(Control of Hydrogen Supply to Hydrogen Tank 21d)

For example, when a charge rate R1a of the first power storage unit 17a is equal to or higher than a full charge threshold Thrf (Thrf>Thr1) and the power P supplied from the first power generation device 11 (DC power generation device 11a, AC power generation device 11b) is equal to or larger than a power threshold Thp, the control device 13 determines that surplus power is generated and drives the hydrogen storage unit 21.

Specifically, the control device 13 drives the hydrogen generation device 21b to generate hydrogen. The control device 13 drives the heat retaining and cooling unit 21c to fill the hydrogen tank 21d with the generated hydrogen.

(Control of Hydrogen Supply to Liquid Tank 21i)

When the hydrogen filling rate R3 of the hydrogen tank 21d is equal to or higher than the second hydrogen filling rate threshold Thr4, it is assumed that the hydrogen tank 21d is sufficiently filled with hydrogen, and the control device 13 drives a hydrogenation device 21h to add generated hydrogen to an aromatic compound such as toluene to generate an organic hydride (saturated condensed cyclic hydrocarbon) such as methylcyclohexane, and accumulates the organic hydride in the liquid tank 21i.

However, supply of the hydrogen generated by the hydrogen generation device 21b to hydrogenation device 21h may be performed before supply of the hydrogen to the hydrogen tank 21d.

(Control of Hydrogen Supply to Second power generation device 12)

When the hydrogen filling rate R3 of the hydrogen tank 21d is equal to or higher than the second hydrogen filling rate threshold Thr4 and the liquid amount Q of the liquid tank 21i is equal to or higher than a tank capacity threshold Thq, the control device 13 drives the heat retaining and cooling unit 21c to supply hydrogen in the hydrogen tank 21d to the second power generation device 12 and/or drives a dehydrogenation device 21j to separate hydrogen from the organic hydride in the liquid tank 21i and supply the separated hydrogen to the second power generation device 12. The control device 13 drives the second power generation device 12.

(Switching Control of Switching Unit 22)

However, when the hydrogen filling rate R3 of the hydrogen tank 21d is equal to or higher than the second hydrogen filling rate threshold Thr4, the liquid amount Q of the liquid tank 21i is equal to or higher than the tank capacity threshold Thq, the charge rate R1a of the first power storage unit 17a is equal to or higher than the full charge threshold Thrf, and the power P supplied from the first power generation device 11 (DC power generation device 11a, AC power generation device 11b) is equal to or larger than the power threshold Thp, the control device 13 drives the first switching unit 22a and the second switching unit 22b, and switches the supply destination of the power from the first power generation device 11 from the first power storage unit 17a to the second power storage unit 17b.

(Power Supply Control from Second Power Storage Unit 17b to First Power Storage Unit 17a)

When the charge rate R1a of the first power storage unit 17a is lower than full charge threshold Thrf and a charge rate R1b of the second power storage unit 17b is equal to or higher than the full charge threshold Thrf, the control device 13 causes the second power storage unit 17b to supply power to the first power storage unit 17a via the second output terminal unit 24b2 and the input terminal unit 24a.

(Fixed Power Storage Unit 17)

The fixed power storage unit 17 of the second embodiment includes the first power storage unit 17a and the second power storage unit 17b.

(First Power Storage Unit 17a)

The first power storage unit 17a includes a power storage device that accumulates power from the DC power generation device 11a and the like.

The first power storage unit 17a is fixed at a predetermined position of the building 25 without considering attachment and detachment. However, the first power storage unit 17a may be held at a predetermined position of building 25 in a detachable state.

The first power storage unit 17a supplies the accumulated power to the electric device (for example, the first load 19a or the like) connected to the first output terminal unit 24b1, and the hydrogen generation device 21b.

(Second Power Storage Unit 17b)

The second power storage unit 17b includes a power storage device that accumulates power from the DC power generation device 11a and the like. The power storage device of the second power storage unit 17b accumulates the power from the second power generation device 12. Accordingly, the second power storage unit 17b is also used as a fuel cell power storage unit.

The second power storage unit 17b is fixed at a predetermined position of the building 25 without considering attachment and detachment. However, the second power storage unit 17b may be held at a predetermined position of building 25 in a detachable state.

The power accumulated in the second power storage unit 17b is supplied to the electric device (for example, the first load 19a, the input terminal unit 24a, and the like) connected to the second output terminal unit 24b2, and the hydrogen generation device 21b. However, power supply from the second power storage unit 17b to the hydrogen generation device 21b may be omitted.

The charge capacity of the power storage device of the first power storage unit 17a is larger than the charge capacity of the power storage device of the second power storage unit 17b (about 3 times).

In addition, the portable power storage unit 18 described in the first embodiment may be provided separately from the first power storage unit 17a and the second power storage unit 17b. In this case, the portable power storage unit 18 receives power supply from at least one of the first power storage unit 17a and the second power storage unit 17b.

(Hydrogen Storage Unit 21)

The hydrogen storage unit 21 of the second embodiment includes the electrolytic solution supply unit 21a including a water intake unit 21a1, the hydrogen generation device 21b, the heat retaining and cooling unit 21c, the hydrogen tank 21d, a communication pipe 21e, a detecting device 21f, a hydrogen supply unit 21g, the hydrogenation device 21h, the liquid tank 21i, and the dehydrogenation device 21j.

Among them, the hydrogen tank 21d and the liquid tank 21i function as accumulation units.

(Electrolytic Solution Supply Unit 21a)

The configuration of the electrolytic solution supply unit 21a is similar to the configuration of the electrolytic solution supply unit 21a of the first embodiment. That is, the electrolytic solution supply unit 21a is provided with the water intake unit 21a1 (not shown in FIG. 9).

(Hydrogen Generation Device 21b)

The hydrogen generation device 21b includes a water electrolyzer or the like, and generates hydrogen by performing electrolysis on the basis of power supplied from the DC power generation device 11a or the like.

The electrolytic solution supply unit 21a and the hydrogen generation device 21b may be configured separately or integrally.

The hydrogen generation device 21b communicates with the second power generation device 12, the hydrogen tank 21d, the hydrogen supply unit 21g, the hydrogenation device 21h, and hydrogen supply unit 21g via the communication pipe 21e.

The communication pipe 21e is provided with a valve (flow rate control device of the communication pipe 21e) that controls the flow of hydrogen such as the supply amount of hydrogen from the hydrogen generation device 21b. FIG. 9 shows an example in which, in the communication pipe 21e, an eleventh valve b1 is provided between the hydrogen generation device 21b and the hydrogenation device 21h, a twelfth valve b2 is provided between the hydrogen generation device 21b and the hydrogen supply unit 21g, a thirteenth valve b3 is provided between the hydrogen generation device 21b and the dehydrogenation device 21j, a fourteenth valve b4 is provided between the hydrogen generation device 21b and the hydrogen tank 21d, and a fifteenth valve b5 is provided between the second power generation device 12 and the hydrogen generation device 21b.

The valves (eleventh valve b1 to fifteenth valve b5) of the communication pipe 21e function as a flow rate control device (first flow rate control device) of the communication pipe 21e that controls the supply amount of hydrogen obtained by the hydrogen generation device 21b. However, the first flow rate control device may include other members.

When hydrogen is supplied from the hydrogen generation device 21b to the hydrogenation device 21h, the eleventh valve b1 in the communication pipe 21e is opened, and the other valves (the twelfth valve b2 to the fifteenth valve b5) are closed.

The valves (the eleventh valve b1 to the fifteenth valve b5) provided in the communication pipe 21e are electrically opened and closed under the control of the control device 13, for example.

(Heat Retaining and Cooling Unit 21c)

The configuration of the heat retaining and cooling unit 21c is similar to the configuration of the heat retaining and cooling unit 21c of the first embodiment.

(Hydrogen Tank 21d)

The configuration of the hydrogen tank 21d is similar to the configuration of the hydrogen tank 21d of the first embodiment.

In the second embodiment, an example in which only one hydrogen tank 21d is provided is shown, but a plurality of hydrogen tanks 21d may be provided as in the first embodiment.

Although not shown in FIG. 9 and the like, a buffer tank 21d1 and a pressure reducing device 21d2 may be provided.

The configuration of the detecting device 21f is similar to the configuration of the detecting device 21f of the first embodiment.

(Hydrogen Supply Unit 21g)

Similarly to the hydrogen supply unit 21g of the first embodiment, the hydrogen supply unit 21g is detachably connected to the third electric vehicle c3 or the like, and supplies hydrogen from the hydrogen tank 21d or the like to the in-vehicle fixed hydrogen storage device 31c of the third electric vehicle c3.

As in the first embodiment, a high-pressure hydrogen tank or the like may be detachably connected to the hydrogen supply unit 21g. In this case, hydrogen from the high-pressure hydrogen tank or the like may be supplied to the hydrogen tank 21d or the like.

(Hydrogenation Device 21h)

The hydrogenation device 21h adds hydrogen to an aromatic compound in a hydrogenation reaction to produce an organic hydride. A catalyst (first catalyst 21h1, see FIG. 13) used for activating the hydrogenation reaction is heated by a catalyst heating device for the hydrogenation reaction. However, as shown in a fourth embodiment described later, the first catalyst 21h1 may be heated by using heat obtained by a device different from the catalyst heating device of the hydrogenation reaction, such as the solar water heater 20.

(Liquid Tank 21i)

The liquid tank 21i accumulates the organic hydride generated by the hydrogenation device 21h.

The liquid tank 21i is provided with a liquid amount detecting device (not shown) that detects a liquid amount Q of the tank.

(Dehydrogenation Device 21j)

The dehydrogenation device 21j separates hydrogen from the organic hydride in a dehydrogenation reaction. The catalyst (second catalyst 21j1, see FIG. 13) used for activating the dehydrogenation reaction is heated by a catalyst heating device for the dehydrogenation reaction which is not shown. However, as described in a fourth embodiment to be described later, the second catalyst 21j1 may be heated using heat obtained by the device different from the catalyst heating device of the dehydrogenation reaction, such as the solar water heater 20.

(Aromatic Compound Tank)

The hydrogen storage unit is provided with a tank (not shown) for accumulating an aromatic compound to be supplied to the hydrogenation device 21h and a tank (not shown) for accumulating an aromatic compound obtained by separating and purifying hydrogen in the dehydrogenation device 21j.

The material (hydrogenated material) to which hydrogen is added is not limited to an aromatic compound, and may be an aldehyde, a ketone, or the like.

(Switching Unit 22)

The switching unit 22 of the second embodiment includes the first switching unit 22a and the second switching unit 22b.

(First Switching Unit 22a)

The first switching unit 22a switches the supply destination of power from the DC power generation device 11a between the first power storage unit 17a and the second power storage unit 17b.

(Second Switching Unit 22b)

The second switching unit 22b switches the supply destination of the power from the AC power generation device 11b between the first power storage unit 17a and the second power storage unit 17b.

(Switching Control)

Normally, the power from the DC power generation device 11a is supplied to the first power storage unit 17a via the first conversion unit 13a1 and the first switching unit 22a, and power from the AC power generation device 11b is supplied to the first power storage unit 17a via the second conversion unit 13a2 and the second switching unit 22b.

However, when the first power storage unit 17a is in the fully charged state and the hydrogen tank 21d and the liquid tank 21i at the subsequent stage have a high hydrogen filling degree, the power from the DC power generation device 11a is supplied to the second power storage unit 17b via the first conversion unit 13a1 and the first switching unit 22a, and the power from the AC power generation device 11b is supplied to the second power storage unit 17b via the second conversion unit 13a2 and the second switching unit 22b.

Specifically, when the hydrogen filling rate R3 of the hydrogen tank 21d is equal to or higher than the second hydrogen filling rate threshold Thr4, the liquid amount Q of the liquid tank 21i is equal to or higher than the tank capacity threshold Thq, the charge rate R1a of the first power storage unit 17a is equal to or higher than the full charge threshold Thrf, and the power P supplied from the first power generation device 11 is equal to or larger than the power threshold Thp, the supply destination of the power from the first power generation device 11 is switched from the first power storage unit 17a to the second power storage unit 17b.

(Input/Output Terminal Unit 24)

The Input/output terminal unit 24 includes the input terminal unit 24a, the first output terminal unit 24b1, and the second output terminal unit 24b2.

(Input Terminal Unit 24a)

The input terminal unit 24a is detachably connected to an external power supply (for example, commercial power supply) or an internal power supply (second power storage unit 17b).

The power from the external power supply connected to the input terminal unit 24a is supplied to the first power storage unit 17a via the input terminal unit 24a and the third conversion unit 13a3.

Note that the input terminal unit 24a may be connected to the second output terminal unit 24b2 via a cable.

FIG. 9 shows an example in which the input terminal unit 24a is connected to the second output terminal unit 24b2 via a cable.

The input terminal unit 24a may be connected to the first electric vehicle c1 as an external power supply. In this case, the third conversion unit 13a3 and the input terminal unit 24a function as the second converter 14b of the charger 14 described in the first embodiment.

(First Output Terminal Unit 24b1)

The first output terminal unit 24b1 is connected to an external electric device (for example, the first electric vehicle c1 and the like) or an internal electric device (for example, the first load 19a or the like).

The power from the first power storage unit 17a is supplied to the electric device connected to the first output terminal unit 24b1 via the fourth conversion unit 13a4 and first output terminal unit 24b1.

When the first output terminal unit 24b1 is connected to the first electric vehicle c1, the fourth conversion unit 13a4 and the first output terminal unit 24b1 function as the first converter 14a of the charger 14 described in the first embodiment.

The power supply from the first power storage unit 17a to the internal electric device such as the first load 19a may be performed without through the first output terminal unit 24b1. In this case, the power from first power storage unit 17a is supplied to the first load 19a and the like via fourth conversion unit 13a4.

(Second Output Terminal Unit 24b2)

The second output terminal unit 24b2 is connected to an external electric device (for example, the first electric vehicle c1 and the like) or an internal electric device (for example, the first load 19a or the like).

The power from the second power storage unit 17b is connected to the electric device connected to the second output terminal unit 24b2 via the fifth conversion unit 13a5 and the second output terminal unit 24b2.

The second output terminal unit 24b2 may be connected to the input terminal unit 24a via the cable.

When the second output terminal unit 24b2 is connected to the first electric vehicle c1, the fifth conversion unit 13a5 and the second output terminal unit 24b2 function as the charger 14 described in the first embodiment.

The power supply from the second power storage unit 17b to the internal electric device such as the first load 19a may be performed without through the second output terminal unit 24b2. In this case, the power from the second power storage unit 17b is supplied to the first load 19a and the like via the fifth conversion unit 13a5.

(Building 25)

Similarly to the first embodiment, the building 25 is a building in which a first load 19a and the like are installed.

The second power generation device 12, the first power storage unit 17a, the second power storage unit 17b, the hydrogen generation device 21b, the hydrogen tank 21d, the hydrogenation device 21h, the liquid tank 21i, the dehydrogenation device 21j, and the like are disposed inside the building 25.

(Effect of Providing First Power Storage Unit 17a, Second Power Storage Unit 17b, and Hydrogen Storage Unit 21)

The power from the first power storage unit 17a is supplied to the hydrogen generation device 21b.

The hydrogen obtained by the hydrogen generation device 21b is accumulated in an accumulation unit (Hydrogen tank 21d, liquid tank 21i), and used for power generation by the second power generation device 12.

The power obtained by the second power generation device 12 is not directly supplied to the first power storage unit 17a, but is supplied to the second power storage unit 17b, and then is supplied to the first power storage unit 17a through conversion from DC to AC and conversion from AC to DC via the fifth conversion unit 13a5 and the like.

Therefore, as compared with the form in which the power obtained by the second power generation device 12 is directly supplied to the first power storage unit 17a, the control (voltage, current, timing, or the like) for returning the power to the first power storage unit 17a can be easily performed.

(Effect of Providing Two Types of Devices for Accumulating Hydrogen)

A device (first power storage unit 17a, second power storage unit 17b) that accumulates energy obtained by the first power generation device 11 or the like as power and a device (hydrogen tank 21d, liquid tank 21i) that accumulates energy as hydrogen are used in combination.

Therefore, even when the first power storage unit 17a or the like is fully charged, it is possible to convert surplus power into hydrogen and accumulate a large amount of energy.

When the power supply from the first power generation device 11 is not sufficient and the power accumulated in the first power storage unit 17a or the like is not sufficient, the hydrogen in the accumulation unit (hydrogen tank 21d, liquid tank 21i) can be replaced with the power to supply the power to the electric device such as the first load 19a.

The accumulation unit that accumulates hydrogen can increase the capacity relatively easily as compared with a storage battery that accumulates power.

Therefore, surplus power can be easily accumulated as hydrogen by using the accumulation unit (hydrogen tank 21d, liquid tank 21i) having an appropriate size based on a difference between the power obtained by the first power generation device 11 and the power required by the electric device such as the first load 19a.

In addition, not only power but also hydrogen can be supplied to an external device.

(Effects of Performing Power Storage Control and Hydrogen Accumulation Control)

Charge, hydrogen generation, hydrogen accumulation, power generation based on hydrogen, and the like can be controlled according to the degree of charge of the first power storage unit 17a and the second power storage unit 17b, the hydrogen filling degree of the hydrogen tank 21d, and the liquid amount of the liquid tank 21i.

In the second embodiment, a solar power generation device having a power generation capacity of 1.5 kW is used as the DC power generation device 11a.

As the AC power generation device 11b, a wind power generation device having a power generation capacity of 300 W is used.

As the second power generation device 12, a fuel cell having a rated output power of 3 kW, a rated output voltage of DC 48 V, a hydrogen supply amount of 2670 SL (Standard Litter)/h, and a hydrogen pressure of 0.06 to 0.07 MPa is used.

A DC/DC converter having an output voltage of 48 V is used as the first conversion unit 13a1.

As the second conversion unit 13a2, an AC/DC converter having an output voltage of 48 V is used.

As the third conversion unit 13a3, an AC/DC converter having a three-phase input voltage of 200 V, an input power of 3 kW to 7.5 kW, and an output power of 15 kWh or less is used.

As the fourth conversion unit 13a4, a DC/AC inverter having a three-phase output voltage of 200 V and an output power of 12 kW is used.

As the fifth conversion unit 13a5, a DC/AC inverter having a three-phase output voltage of 200 V and an output power of 3 kW is used.

As the first power storage unit 17a, three lithium ion batteries having a voltage of 48 V and a power of 5 kWh are connected in series or in parallel.

As the second power storage unit 17b, a power storage unit provided with one lithium ion battery having a voltage of 48 V and a power of 5 kWh is used.

As the hydrogen generation device 21b, a water electrolyzer having a hydrogen generation amount of 183 NL/h, a hydrogen pressure of 0.45 MPa, an electrolysis voltage of DC 48 V, a supply power of 1500 W, and an input voltage of DC 48 V is used.

As the hydrogen tank 21d, a hydrogen storage alloy container having a capacity of 10,000 NL is used.

In this case, one first power and hydrogen supply station 10a can independently supply power to one apartment or the like without supplying power from a commercial power supply. In addition, since the numerical value of the specification (capacity, pressure, or the like) of each unit is relatively small, application to each authority at the time of installing the hydrogen tank 21d or the like in the building 25 is simple as compared with a form in which the numerical value of the specification of each unit is large.

However, the numerical values such as the capacity of each unit are merely examples, and the present invention is not limited thereto.

Next, an example in which the server 100 is cooled on the basis of the power from the first power and hydrogen supply station 10a will be described (see third embodiment, FIG. 10).

In the third embodiment, an example is shown in which power is supplied from a first output terminal unit 24b1 of a first power and hydrogen supply station 10a to the heat exchange unit 130 and the like.

However, power may be supplied from a second output terminal unit 24b2 of the first power and hydrogen supply station 10a to the heat exchange unit 130 and the like.

The first power and hydrogen supply station 10a of the third embodiment includes a first power generation device 11, a second power generation device 12, a control device 13, a first conversion device 13a, a fixed power storage unit 17, a hydrogen storage unit 21, a switching unit 22, and an input/output terminal unit 24.

A heating medium circulating device (liquid tank 110, liquid feeding unit 120, heat exchange unit 130, switching device 140) is connected to the first power and hydrogen supply station 10a of the third embodiment.

The first power and hydrogen supply station 10a and the heating medium circulating device of the third embodiment constitute a cooling device that cools a computer such as the server 100.

Configurations of the first power generation device 11, the second power generation device 12, the control device 13, the first conversion device 13a, the fixed power storage unit 17, the hydrogen storage unit 21, the switching unit 22, and the input/output terminal unit 24 of the third embodiment are similar to those of the first power generation device 11, the second power generation device 12, the control device 13, the first conversion device 13a, the fixed power storage unit 17, the hydrogen storage unit 21, the switching unit 22, and the input/output terminal unit 24 of the second embodiment.

Hereinafter, differences from the second embodiment, that is, the configuration of the heating medium circulating device will be mainly described.

As in the first embodiment, the first power and hydrogen supply station 10a of the third embodiment may include a charger 14, a station-side display unit 15, a station-side operation unit 16, and a communication unit 23.

A second power and hydrogen supply station 10b and a third power and hydrogen supply station 10c of the third embodiment may have the same configuration as that of the first power and hydrogen supply station 10a of the third embodiment.

(Liquid Tank 110)

The liquid tank 110 holds at least a heat generating member (CPU, storage, or the like) in a computer such as the server 100 in a state of being immersed in a first heating medium. That is, the liquid tank 110 holds the computer and the first heating medium (cooling solution) for cooling said computer.

The first heating medium is made of an insulating liquid such as a fluorine-based inert liquid or pure water.

(Liquid Feeding Unit 120)

The liquid feeding unit 120 includes a pump, a compressor, and the like, and is used to circulate the first heating medium between the liquid tank 110 and the heat exchange unit 130.

(Heat Exchange Unit 130)

The heat exchange unit 130 includes a fan 130a, a spray unit 130b, and the like, and cools the first heating medium from the liquid tank 110 by heat exchange.

The fan 130a supplies cooling air to a pipe through which the first high-temperature heating medium passes.

The spray unit 130b injects atomized cooling water to at least one of the pipe through which the first high-temperature heating medium passes and the fan 130a.

However, the heat exchange unit 130 may be configured to cool the first heating medium using a refrigerant such as water in a cooling tower or the like instead of the fan 130a.

The liquid tank 110, the liquid feeding unit 120, and the heat exchange unit 130 constitute the heating medium circulating device (chiller) for cooling the server 100.

(Switching Device 140)

The server 100 is connected to the commercial power supply and the first output terminal unit 24b1 via the switching device 140.

Normally, power from the commercial power supply is supplied to the server 100. When power supply from the commercial power supply is interrupted, the switching device 140 performs timing synchronization and then performs switching control so that the power from the first output terminal unit 24b1 is supplied to the server 100.

(Effect that Cooling Device Including Liquid Feeding Unit 120 Cools Server 100 and the Like)

Since the liquid is used as the first heating medium, it is possible to efficiently cool the server 100 as compared with a form in which cooling is performed using a gas such as air.

Cooling using the heating medium circulation is performed based on power from two types of power generation devices (first power generation device 11, second power generation device 12). Therefore, as compared with a form in which cooling using heating medium circulation is performed on the basis of power from the commercial power supply, the possibility of falling into an uncooling state due to power supply stop from the commercial power supply such as a power failure can be reduced.

(Cooling Effect Using Spray Unit 130b)

By injecting atomized cooling water from the spray unit 130b into a pipe or the like through which the first heating medium passes, cooling using heat of vaporization can be performed.

(Effect of Supplying Power to Server 100 or the Like Via Switching Device 140)

Normally, a computer such as the server 100 is driven based on power from the commercial power supply. Even when power supply from the commercial power supply is interrupted due to a power failure or the like, the operation of said computer can be maintained by the power of the first power storage unit 17a or the like.

The target to be cooled by the heating medium circulating device of the third embodiment is not limited to the server 100 of the power and hydrogen supply system 1, that is, the server 100 that communicates with the first power and hydrogen supply station 10a to the third power and hydrogen supply station 10c and the first electric vehicle c1 to the fourth electric vehicle c4 via the network. The heating medium circulating device of the third embodiment may be used for cooling a server or a computer different from the power and hydrogen supply system 1.

(Application Example of Arrangement of Heating medium Circulating Device)

In the third embodiment, an example has been described in which the heating medium circulating device including the heat exchange unit 130 and the like is configured separately from the first power and hydrogen supply station 10a.

Figure 11:
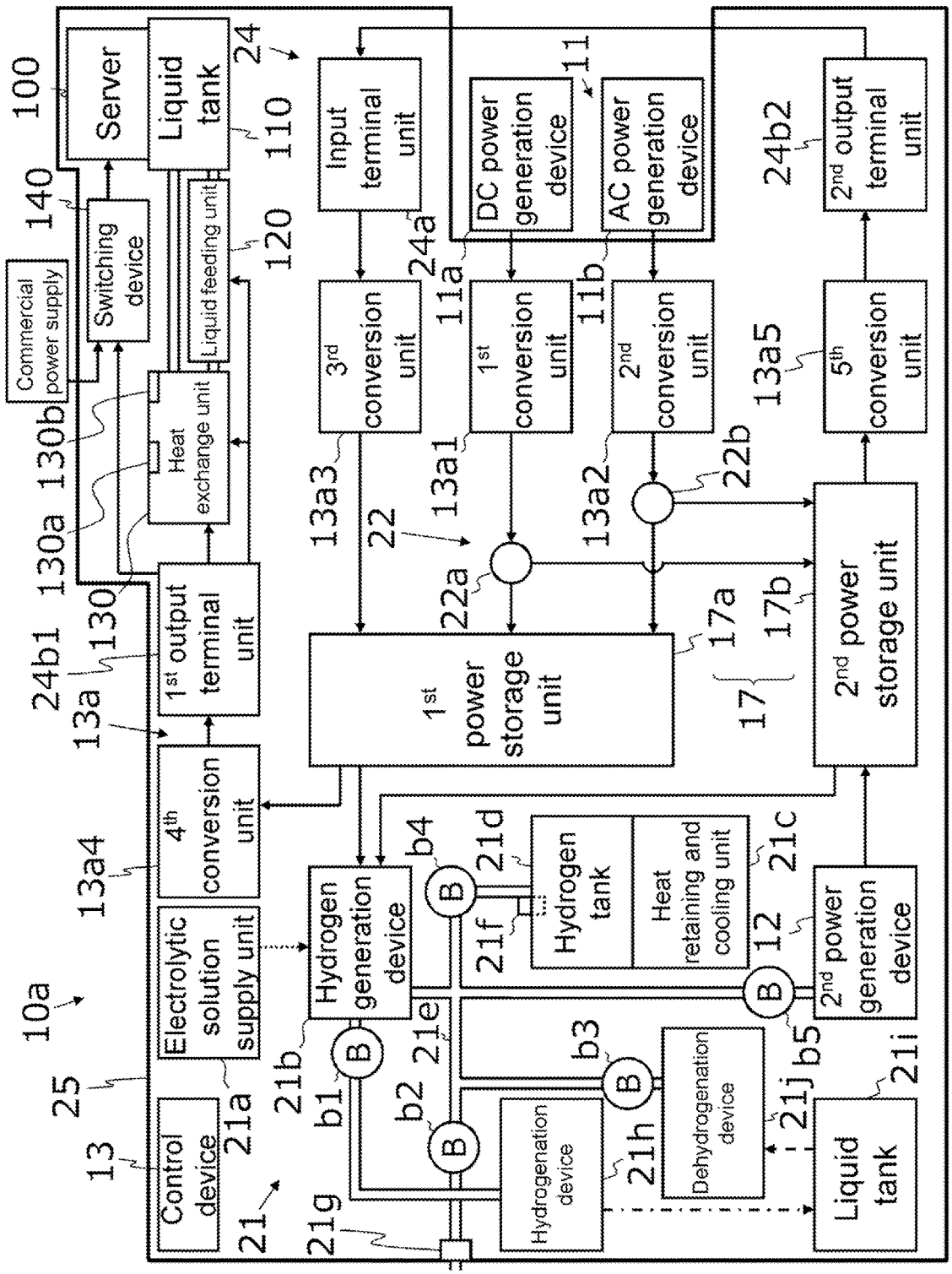
FIG. 11 is a block diagram of the cooling device of the third embodiment provided in a container (housing).

However, members (other than the first power generation device 11) constituting the first power and hydrogen supply station 10a and members constituting the heating medium circulating device may be provided inside one housing 25 (for example, a 20-foot container) (see FIG. 11). Even in this case, the first power generation device 11 is disposed on the upper surface of said housing or the like.

In this case, by carrying said one housing 25, the server 100 can be operated at various places without relying on external power supply such as commercial power supply.

(Application Example of Power and Hydrogen Supply Station, Fourth Embodiment)

Next, a fourth embodiment will be described.

A first power and hydrogen supply station 10a of the fourth embodiment includes a solar water heater 20 unlike the first power and hydrogen supply station 10a of the third embodiment.

In addition, heat is supplied from a unit that generates heat such as the solar water heater 20 to a unit that requires heat such as the hydrogen tank 21d.

Hereinafter, differences from the third embodiment will be mainly described.

Figure 12:
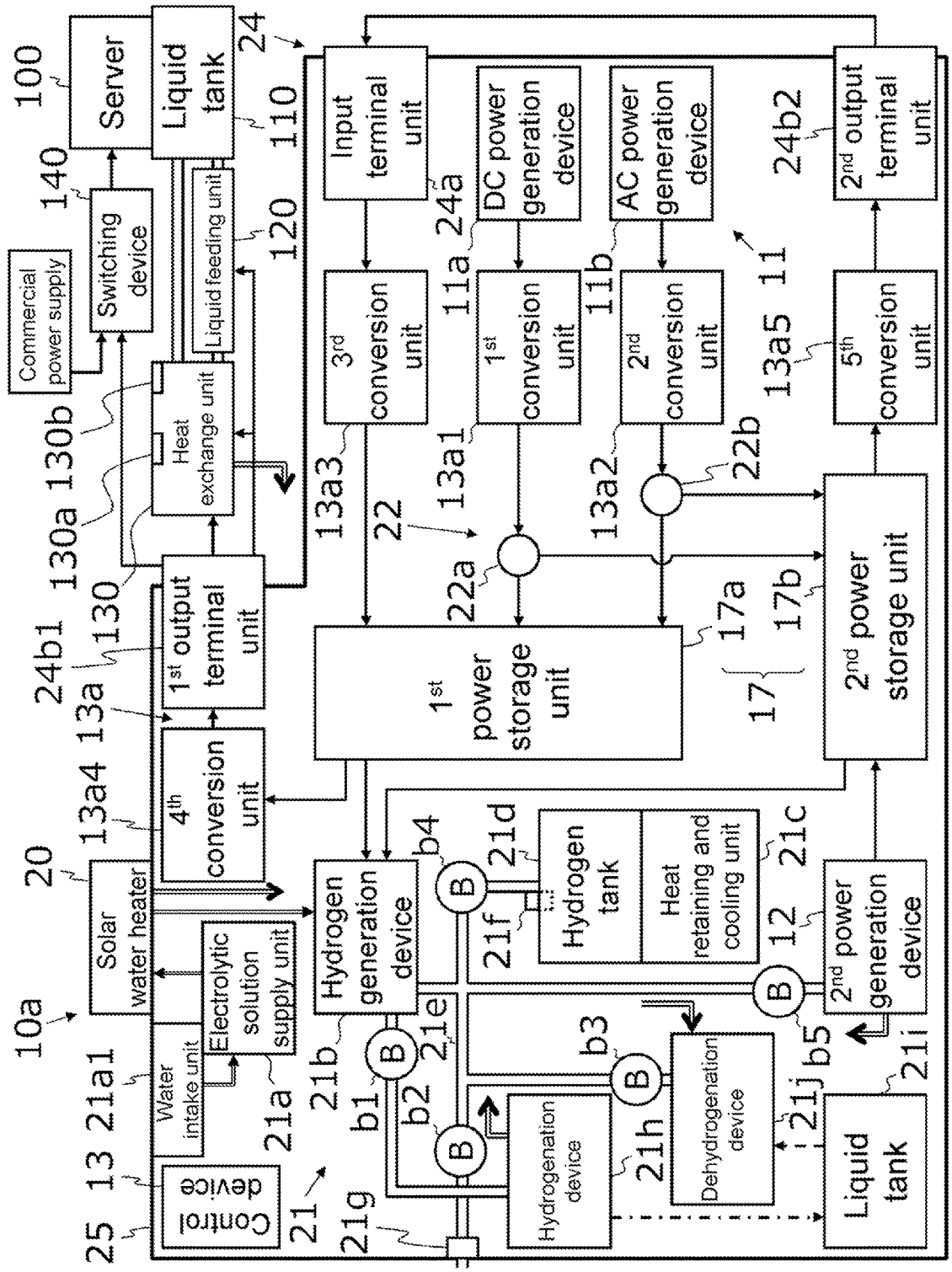
FIG. 12 is a block diagram showing a configuration of one of the power and hydrogen supply stations according to a fourth embodiment.

The first power and hydrogen supply station 10a of the fourth embodiment includes a first power generation device 11, a second power generation device 12, a control device 13, a first conversion device 13a, a fixed power storage unit 17, the solar water heater 20, a hydrogen storage unit 21, a switching unit 22, and an input/output terminal unit 24 (see FIG. 12).

A heating medium circulating device (liquid tank 110, liquid feeding unit 120, heat exchange unit 130, switching device 140) is connected to the first power and hydrogen supply station 10a of the fourth embodiment. Similarly to the third embodiment, the first power and hydrogen supply station 10a and the heating medium circulating device may be configured separately, or may be configured inside one housing 25.

Configurations of the first power generation device 11, the second power generation device 12, the control device 13, the first conversion device 13a, the fixed power storage unit 17, the hydrogen storage unit 21, the switching unit 22, the input/output terminal unit 24, the building 25, the server 100, the liquid tank 110, the liquid feeding unit 120, the heat exchange unit 130, and the switching device 140 of the fourth embodiment are similar to those of the first power generation device 11, the second power generation device 12, the control device 13, the first conversion device 13a, the fixed power storage unit 17, the hydrogen storage unit 21, the switching unit 22, the input/output terminal unit 24, the building 25, the server 100, the liquid tank 110, the liquid feeding unit 120, the heat exchange unit 130, and the switching device 140 of the third embodiment.

As in the first embodiment, the first power and hydrogen supply station 10a of the fourth embodiment may include a charger 14, a station-side display unit 15, a station-side operation unit 16, and a communication unit 23.

A second power and hydrogen supply station 10b and a third power and hydrogen supply station 10c of the fourth embodiment may have the same configuration as that of the first power and hydrogen supply station 10a of the fourth embodiment.

In the fourth embodiment, an example is shown in which power is supplied from the first output terminal unit 24b1 of the first power and hydrogen supply station 10a to the heat exchange unit 130 and the like.

However, power may be supplied from a second output terminal unit 24b2 of the first power and hydrogen supply station 10a to the heat exchange unit 130 and the like.

(Solar Water Heater 20)

The solar water heater 20 is a device that heats cold water by solar heat, and includes a heat collector that collects heat of the sun and generates hot water, and a hot water storage tank that accumulates the hot water generated by said heat collector.

The heat collector of the solar water heater 20 is provided in an upper portion of building 25 or the like.

The water obtained by the water intake unit 21a1 is supplied to the heat collector of the solar water heater 20 via the electrolytic solution supply unit 21a or directly without through via the electrolytic solution supply unit 21a.

The hot water (hot water obtained by solar water heater 20) in a hot water storage tank of solar water heater 20 is supplied to the hydrogen generation device 21b.

Therefore, in the fourth embodiment, hot water is supplied to the hydrogen generation device 21b instead of cold water.

By using hot water, it is possible to increase the reaction rate of electrolysis and to suppress the power consumption for obtaining desired hydrogen as compared with the form using cold water.

The hot water obtained by the solar water heater 20 may be used not only for supplying to hydrogen generation device 21b or the like but also for showering or the like.

In a case where moisture in the air is condensed and the condensed water is heated by the solar water heater 20, it is possible to operate each unit of the first power and hydrogen supply station 10a without obtaining supply of a second heating medium from the outside as much as possible.

In addition, hot water (hot water obtained by the solar water heater 20) in a hot water storage tank of the solar water heater 20 or heat transmitted from said hot water is supplied to a member (hydrogen tank 21d, catalyst of hydrogenation device 21h, catalyst of dehydrogenation device 21j) requiring heating in the first power and hydrogen supply station 10a.

That is, heat of hot water obtained by the solar water heater 20 is used to release hydrogen occluded in the hydrogen tank 21d.

In addition, the heat of the hot water obtained by the solar water heater 20 is used for heating the catalyst in at least one of the hydrogenation device 21h and the dehydrogenation device 21j.

Details of transfer of heat obtained by the solar water heater 20 to the hydrogen tank 21d and the like will be described later.

As a result, energy consumption of other heating devices in the heat retaining and cooling unit 21c and the like can be suppressed as compared with a form in which the heat of the hot water obtained by the solar water heater 20 is not used.

(Heat Supply Timing)

When the power supplied from the DC power generation device (solar power generation device) 11a of the first power generation device 11 is smaller than the power threshold Thp, it is desirable that heat generated mainly at the time of power generation by the second power generation device 12 is used for releasing hydrogen occluded in the hydrogen tank 21d.

When the power supplied from the DC power generation device (solar power generation device) 11a of the first power generation device 11 is equal to or larger than the power threshold Thp, it is desirable that the heat of the hot water mainly obtained by the solar water heater 20 is used for releasing the hydrogen occluded in the hydrogen tank 21d.

As a result, in a time zone in which the hot water can be generated using the solar water heater 20, the load of the second power generation device 12 can be suppressed by using hot water obtained by solar water heater 20 as much as possible without using second power generation device 12, and the hydrogen accumulated in the liquid tank 21i can be saved.

(Application Example of Heat Supply Source)

The supply of heat to a member (hydrogen tank 21d, catalyst of hydrogenation device 21h, catalyst of dehydrogenation device 21j) requiring heating in the first power and hydrogen supply station 10a is not limited to a form using the hot water obtained by the solar water heater 20.

For example, at least one of heat generated at the time of power generation of the second power generation device 12, heat generated at the time of hydrogenation reaction in the hydrogenation device 21h, and heat obtained in the heat exchange unit 130 may be used.

In this case, at least one of heat generated at the time of the power generation by the second power generation device 12, the heat of the hot water obtained by the solar water heater 20, the heat generated at the time of the hydrogenation reaction in the hydrogenation device 21h, and the heat obtained by the heat exchange unit 130 is used to release the hydrogen occluded in the hydrogen tank 21d.

Details of transfer of heat generated at the time of power generation by the second power generation device 12 to the hydrogen tank 21d and the like will be described later.

(Application Example of Member Using Heat)

In addition, for heating the catalyst in at least one of the hydrogenation device 21h and the dehydrogenation device 21j, heat generated at the time of power generation by the second power generation device 12 or the like may be used.

(Specific Example of Heat Transfer Structure)

Figure 13:
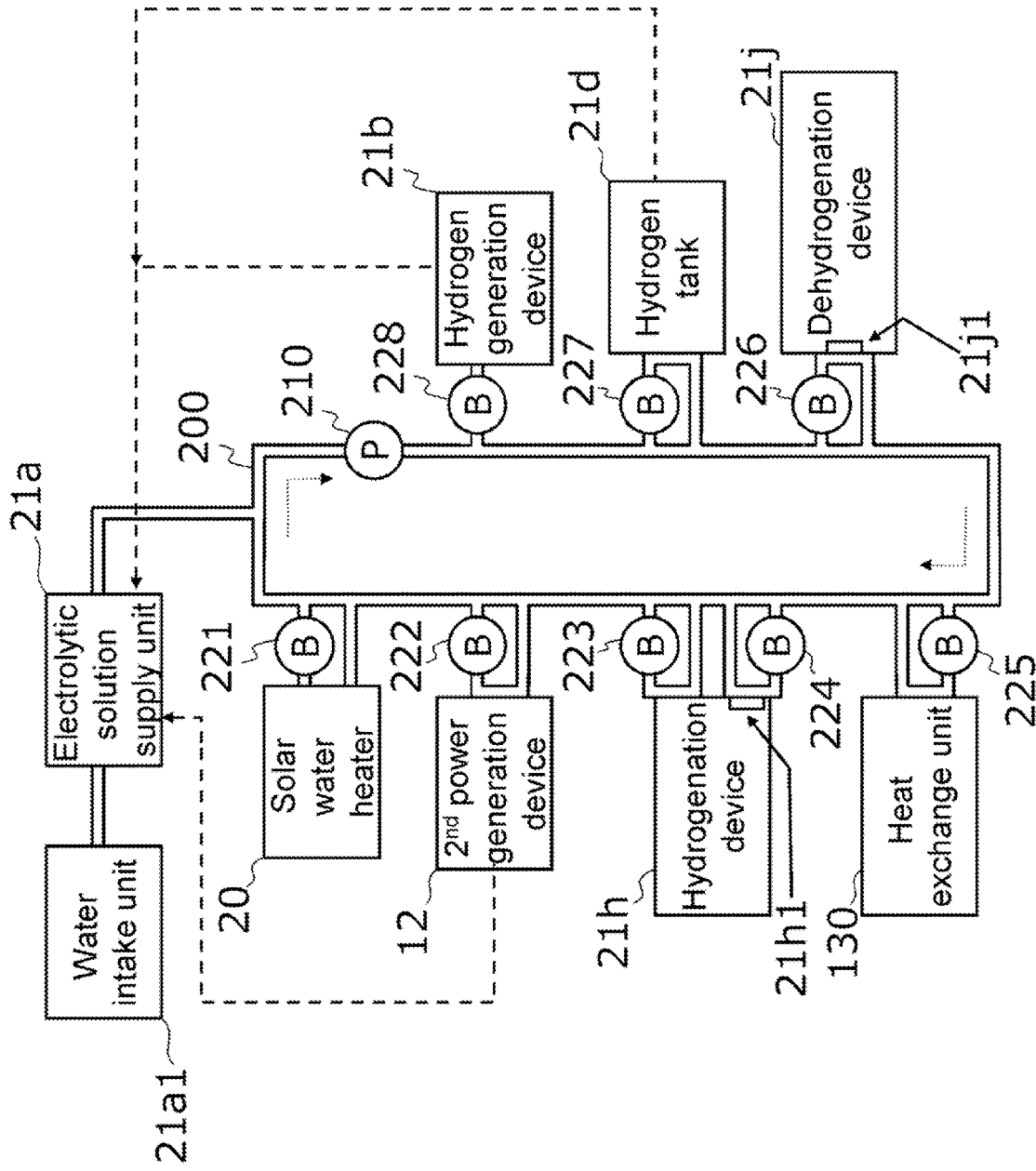
FIG. 13 is a block diagram showing a configuration of circulation of a second heating medium in a fourth embodiment.

A configuration in which the heat generated at the time of the power generation by the second power generation device 12, the heat obtained by the solar water heater 20, the heat generated at the time of the hydrogenation reaction in the hydrogenation device 21h, and the heat obtained by the heat exchange unit 130 are supplied to the hydrogen generation device 21b and the like will be described (see FIG. 13).

The second heating medium (hot water) heated by the heat generated at the time of the power generation by the second power generation device 12, the heat obtained by the solar water heater 20, the heat generated at the time of the hydrogenation reaction in the hydrogenation device 21h, and the heat obtained by the heat exchange unit 130 is supplied to the hydrogen generation device 21b and the like via a circulation path 200.

(Circulation Path 200)

The circulation path 200 is provided with a pump 210 and first to eighth valves 221 to 228.

In order to supply the second heating medium, the electrolytic solution supply unit 21a communicates with the circulation path 200.

The pump 210 and the first valve 221 to the eighth valve 228 function as a flow rate control device (second flow rate control device) of the circulation path 200. However, the second flow rate control device may be composed of other members.

(Pump 210)

The pump 210 circulates hot water in the circulation path 200.

(First Valve 221)

The first valve 221 is provided between the solar water heater 20 and the circulation path 200.

The first valve 221 controls at least one of supply of the second heating medium to the solar water heater 20 and discharge of the second heating medium from the solar water heater 20.

The first valve 221 is opened when the solar water heater 20 generates hot water, such as during daytime, and the first valve 221 is closed when the solar water heater 20 does not generate hot water, such as during nighttime.

(Second Valve 222)

The second valve 222 is provided between the second power generation device 12 and the circulation path 200.

The second valve 222 controls passage of the second heating medium to the vicinity of a region where heat is generated in the second power generation device 12.

The second valve 222 is opened when the second power generation device 12 is performing power generation, and the second valve 222 is closed when the second power generation device is not performing power generation.

Water discharged at the time of power generation by the second power generation device 12 is supplied to the electrolytic solution supply unit 21a. The supply of the discharged water to the electrolytic solution supply unit 21a may be performed via the circulation path 200 or may be performed via another flow path (see a broken line arrow in FIG. 13).

(Third Valve 223)

The third valve 223 is provided between the hydrogenation device 21h and the circulation path 200.

The third valve 223 controls the passage of the second heating medium to the vicinity of a region where heat is generated in the hydrogenation device 21h.

The third valve 223 is opened when the hydrogenation device 21h is performing the hydrogenation reaction, and the third valve 223 is closed when the hydrogenation device is not performing the hydrogenation reaction.

(Fourth Valve 224)

The fourth valve 224 is provided between the hydrogenation device 21h and the circulation path 200.

The fourth valve 224 controls the passage of the second heating medium to the vicinity of the first catalyst 21h1 in order to heat the first catalyst 21h1 in the hydrogenation device 21h.

In a stage before the hydrogenation reaction in the hydrogenation device 21h is activated, when the second heating medium in the circulation path 200 has a predetermined temperature or higher, the fourth valve 224 is opened, and in other time zones, the fourth valve 224 is closed. However, there is a high possibility that the temperature of the catalyst of the hydrogenation device 21h is also high during the hydrogenation reaction, and thus, the fourth valve 224 may be opened.

(Fifth Valve 225)

The fifth valve 225 is provided between the heat exchange unit 130 and the circulation path 200.

The fifth valve 225 controls passage of the second heating medium to a region in contact with a portion of a pipe through which the first heating medium from the liquid tank 110 passes in the heat exchange unit 130. Said portion of said pipe is at a region of at a stage before cooling by the spray unit 130b is performed.

The fifth valve 225 is opened when the server 100 is in operation, and the fifth valve 225 is closed when the server 100 is not in operation.

The second heating medium also functions as a coolant for the first heating medium.

(Sixth Valve 226)

The sixth valve 226 is provided between the dehydrogenation device 21j and the circulation path 200.

The sixth valve 226 controls the passage of the second heating medium to the vicinity of the second catalyst 21j1 in order to heat the second catalyst 21j1 in the dehydrogenation device 21j.

In a stage before the dehydrogenation reaction in the dehydrogenation device 21j is activated, when the second heating medium in the circulation path 200 is at a predetermined temperature or higher, the sixth valve 226 is opened, and in other time zones, the sixth valve 226 is closed.

(Seventh Valve 227)

The seventh valve 227 is provided between the hydrogen tank 21d and the circulation path 200.

The seventh valve 227 controls the passage of the second heating medium to the vicinity of the hydrogen tank 21d in order to heat the hydrogen tank 21d.

When hydrogen occluded in the hydrogen tank 21d is released, the seventh valve 227 is opened, and when hydrogen occluded in the hydrogen tank 21d is not released, the seventh valve 227 is closed.

(Eighth Valve 228)

The eighth valve 228 is provided between the hydrogen generation device 21b and the circulation path 200.

The eighth valve 228 controls the supply of the second heating medium to the hydrogen generation device 21b in order to supply the second heating medium to the hydrogen generation device 21b.

The eighth valve 228 is opened when hydrogen is generated by the hydrogen generation device 21b, and the eighth valve 228 is closed when hydrogen is not generated by the hydrogen generation device 21b.

Moisture (drain water or the like) contained in the gas at the hydrogen generation device 21b, the hydrogen tank 21d, the communication pipe 21e, and the like is supplied to the electrolytic solution supply unit 21a. The supply of moisture contained in the gas to the electrolytic solution supply unit 21a may be performed via the circulation path 200 or may be performed via another flow path (see a broken line arrow in FIG. 13).

(Main Body Of Operation Control)

The operation control of the pump 210 and the opening/closing control of the first valve 221 to the eighth valve 228 are performed by the control device 13 according to the operation state of the station-side operation unit 16.

Note that a heat transfer device (for example, a Peltier element or the like) that transfers heat to the circulation path 200 by electrical control when necessary may be provided between a device that generates heat such as the second power generation device 12 and the circulation path 200.

In addition, a heat transfer device that transfers heat from the circulation path 200 by electrical control when necessary may be provided between the heat receiving device such as the hydrogen tank 21d and the circulation path 200.

Further, only the heat transfer device may be provided between the device that generates heat such as the second power generation device 12 and the device that receives heat such as the hydrogen tank 21d without providing the circulation path 200.

Figure 14:
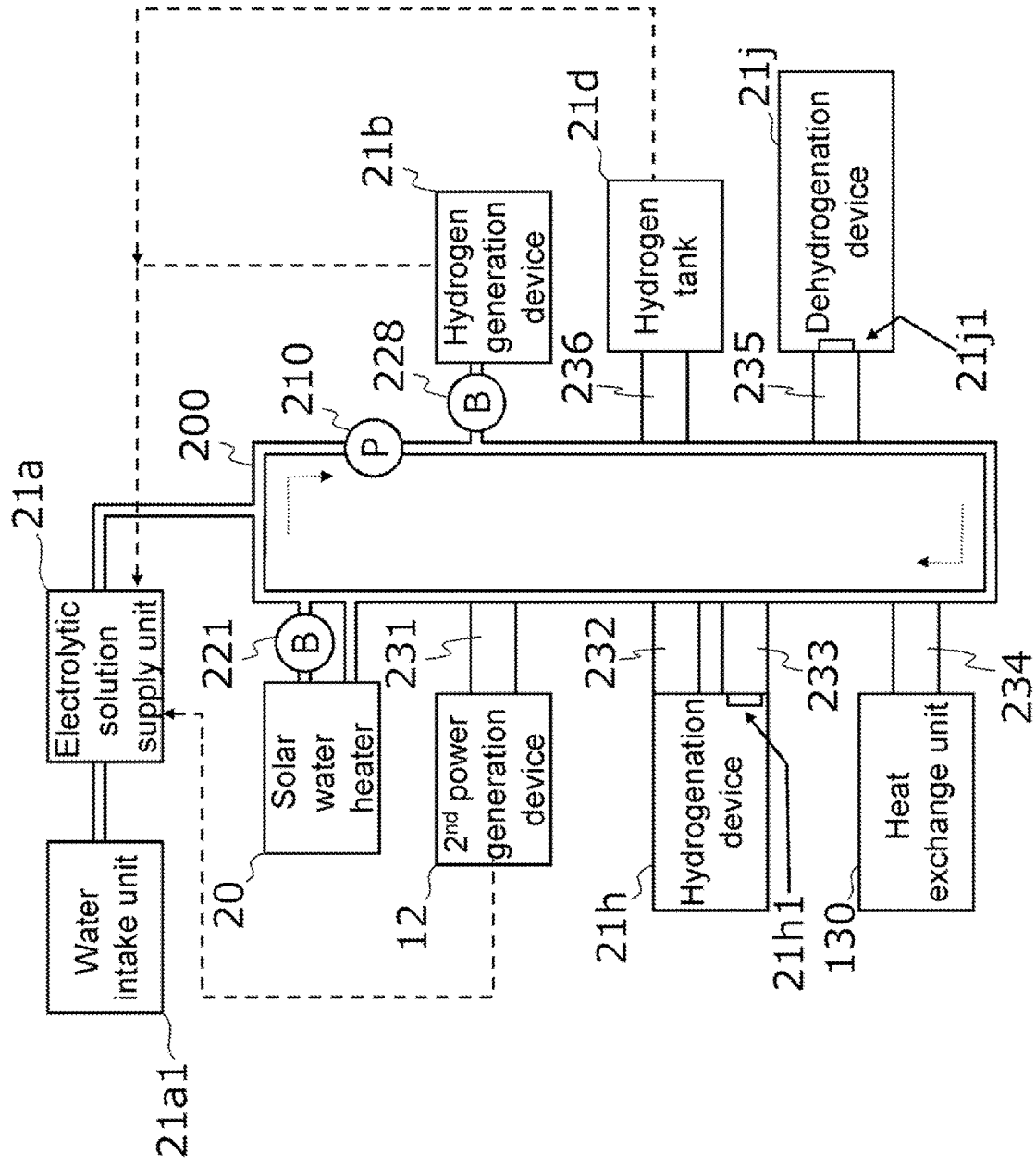
FIG. 14 is a block diagram showing a configuration of circulation of a second heating medium according to a fourth embodiment, in which a heat transfer device is used.

FIG. 14 shows an example in which heat transfer devices (first heat transfer device 231 to sixth heat transfer device 236) are provided instead of the second valve 222 to the seventh valve 227.

The first heat transfer device 231 is provided between a region where heat is generated in the second power generation device 12 and the circulation path 200.

The second heat transfer device 232 is provided between a region where heat is generated in the hydrogenation device 21h and the circulation path 200.

The third heat transfer device 233 is provided between the first catalyst 21h1 in the hydrogenation device 21h and the circulation path 200.

The fourth heat transfer device 234 is provided between the circulation path 200 and a portion of a pipe through which the first heating medium from the liquid tank 110 passes in the heat exchange unit 130. Said portion of said pipe is at a region of a stage before cooling by the spray unit 130b and the circulation path 200.

The fifth heat transfer device 235 is provided between the second catalyst 21j1 in the dehydrogenation device 21j and the circulation path 200.

The sixth heat transfer device 236 is provided between the hydrogen tank 21d and the circulation path 200.

(Application Example Using Auxiliary Power Supply)

In the fourth embodiment, power is supplied from the first power storage unit 17a or the second power storage unit 17b to the electric devices constituting the first power and hydrogen supply station 10a, such as the control device 13, the water intake unit 21a1, the flow rate control device (such as the eleventh valve b1 of the communication pipe 21e) of the communication pipe 21e, and the flow rate control device (pump 210, first valve 221, or the like) of the circulation path 200. However, a third power storage unit 17c different from the first power storage unit 17a and the second power storage unit 17b may be provided (see FIG. 15).

The third power storage unit 17c supplies power to the electric device constituting the first power and hydrogen supply station 10a as an auxiliary power supply. In this case, the switching unit 22 includes a first switching unit 22a, a second switching unit 22b, and a third switching unit 22c. The third switching unit 22c switches the supply destination of the power from the DC power generation device 11a between the third power storage unit 17c and the fifth conversion unit 13a5 (or second power storage unit 17b).

Power obtained by the DC power generation device 11a is supplied to the third power storage unit 17c via the first conversion unit 13a1, the first switching unit 22a, and the third switching unit 22c. However, the power supply to the third power storage unit 17c may be performed from either the first power storage unit 17a or the second power storage unit 17b. Although the connection is not shown in FIG. 15, the power obtained by the AC power generation device 11b or the power from the external power supply connected to the input terminal unit 24a may be supplied to the third power storage unit 17c.

The charge capacity of the power storage device of the second power storage unit 17b is larger than the charge capacity of the power storage device of the third power storage unit 17c. For example, a lithium ion battery having a voltage of 48 V and an electric energy (electric storage capacity) of 15 kWh is used as the first power storage unit 17a, a lithium ion battery having a voltage of 48 V and an electric energy (electric storage capacity) of 10 kWh is used as the second power storage unit 17b, and a lithium ion battery having a voltage of 48 V and an electric energy (electric storage capacity) of 4.8 kWh is used as the third power storage unit 17c.

(Application Example of Power Output)

Figure 15:
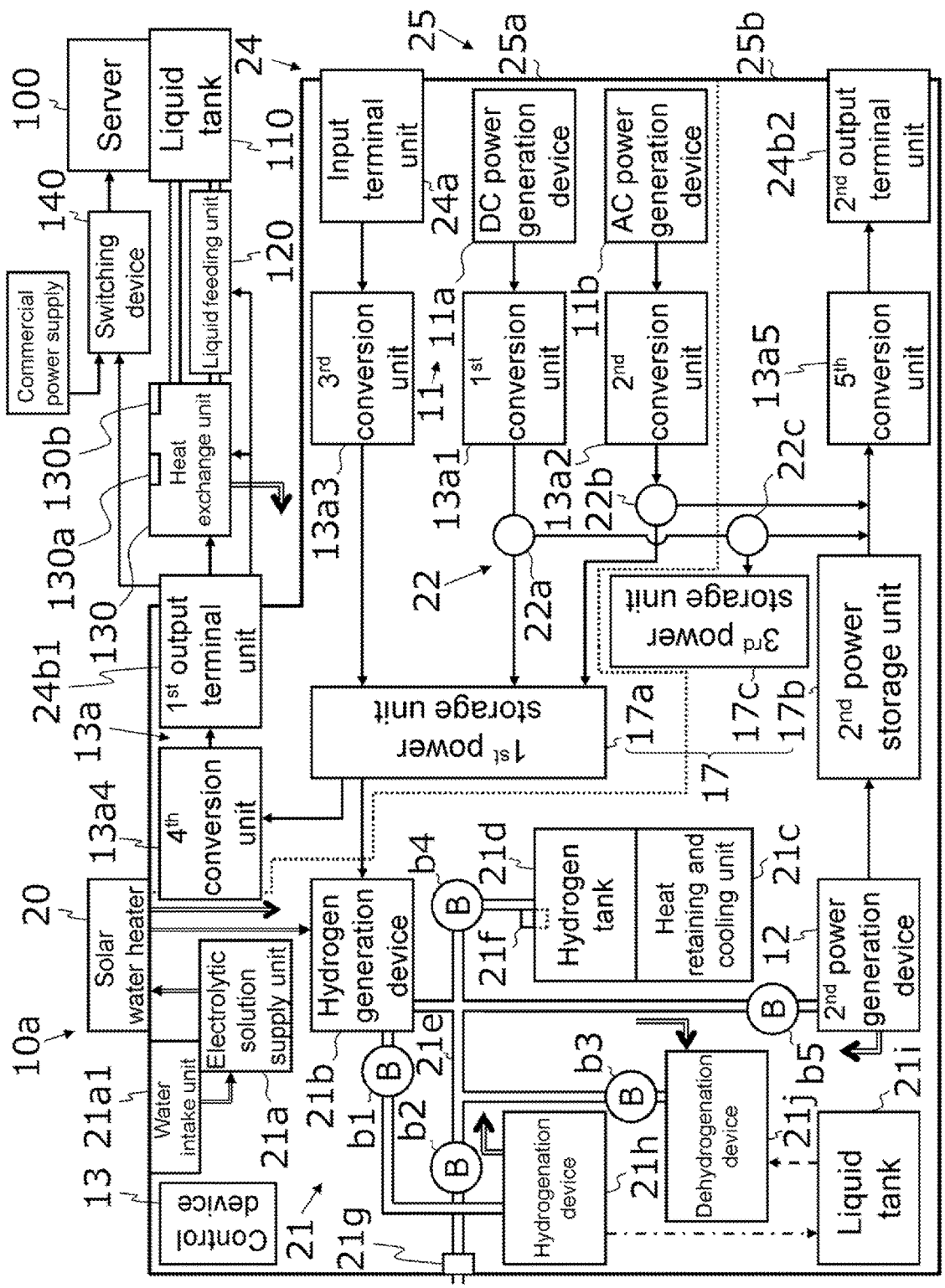
FIG. 15 is a block diagram showing an application example of a configuration of one of the power and hydrogen supply stations according to the fourth embodiment.

In the fourth embodiment, when the power from the DC power generation device 11a is output from the second output terminal unit 24b2, the power from the DC power generation device 11a is temporarily accumulated in the second power storage unit 17b, and then output from the second output terminal unit 24b2. However, as shown in FIG. 15, the power from DC power generation device 11a may be output without via the second power storage unit 17b but via the first conversion unit 13a1, the first switching unit 22a, the third switching unit 22c, the fifth conversion unit 13a5, and the second output terminal unit 24b2.

When the power from the AC power generation device 11b is output from the second output terminal unit 24b2, the power from the AC power generation device 11b is temporarily accumulated in the second power storage unit 17b, and then output from the second output terminal unit 24b2. However, as shown in FIG. 15, the power from the AC power generation device 11b may be output without via the second power storage unit 17b but via the second conversion unit 13a2, the second switching unit 22b, the fifth conversion unit 13a5, and the second output terminal unit 24b2.

(Two Housings)

The members constituting the first power and hydrogen supply station 10a may be housed in one housing (building 25), or may be accommodated in two housings (first housing 25a, second housing 25b). For example, the first housing 25a includes the DC power generation device 11a, the AC power generation device 11b, and the first power storage unit 17a (an upper right region of the dotted line in FIG. 15). The second housing 25b includes the second power generation device 12, the second power storage unit 17b, the third power storage unit 17c, the solar water heater 20, and the hydrogen storage unit 21.

(Effect of Supplying Power To First Flow Rate Control Device (Such as Eleventh Valve b1 of Communication Pipe 21e) by Auxiliary Power Supply (Third Power Storage Unit 17c) Separated from Fuel Cell Power Storage Unit (Second Power Storage Unit 17b))

The auxiliary power supply (third power storage unit 17c) operates the inside of the power supply station (first power and hydrogen supply station 10a), and said auxiliary power supply can be used as a starting power supply for supplying hydrogen to the fuel cell. That is, it is possible to efficiently accumulate power obtained based on hydrogen.

(Effect of Using Renewable Energy-Derived Power Generation Device (First Power Generation Device 11))

It is possible to accumulate surplus power in the form of hydrogen by using a renewable energy-derived power generation device such as solar power generation. The accumulation of hydrogen makes it easier to accumulate energy in a smaller volume than the accumulation of electricity, and causes less deterioration in long-term accumulation.

(Effect of Using Water Obtained by Fuel Cell (Second Power Generation Device 12) or the Like as Electrolytic Solution)

By utilizing water generated in the second power generation device 12 and the hydrogen storage unit 21 as the electrolytic solution, hydrogen can be generated even in a state where supply of water from the outside is small.

(Effect of Supplying Power to Second Flow Rate Control Device (Pump 210 or the Like of Circulation Path 200) by Auxiliary Power Supply (Third Power Storage Unit 17c) Separated from Fuel Cell Power Storage Unit (Second Power Storage Unit 17b))

The auxiliary power supply (third power storage unit 17c) operates the inside of the power supply station (first power and hydrogen supply station 10a), and said auxiliary power supply can be used as a starting power supply for supplying water to the solar water heater 20 and the like.

(Application Example of First Power and Hydrogen Supply Station 10a, Fifth Embodiment)

Figure 16:
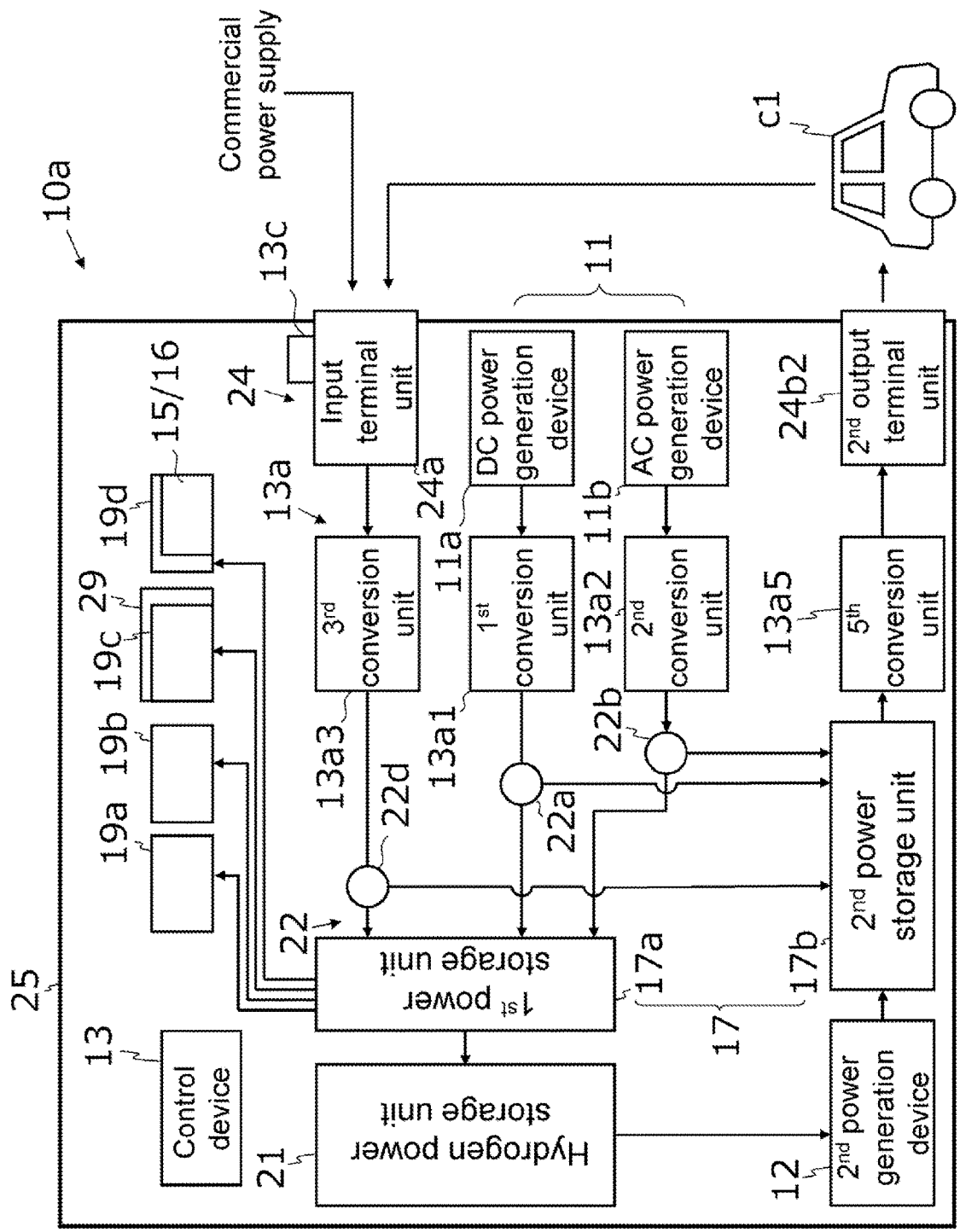
FIG. 16 is a block diagram showing a configuration of one of the power and hydrogen supply stations according to a fifth embodiment.

The first power and hydrogen supply station 10a of the fourth embodiment can be applied to a charging and feeding stand of an electric moving device such as the first electric vehicle c1 (see fifth embodiment, FIG. 16). Hereinafter, differences from the fourth embodiment will be mainly described.

A switching unit 22 of a first power and hydrogen supply station 10a of the fifth embodiment further includes a fourth switching unit 22d between a third conversion unit 13a3 and a first power storage unit 17a.

In the fifth embodiment, as shown in FIG. 16, the solar water heater 20, the first output terminal unit 24b1, and the like may be omitted.

Moreover, the third power storage unit 17c may be omitted. In this case, the first power storage unit 17a or the second power storage unit 17b functions as an auxiliary power supply. In the fifth embodiment, the first power storage unit 17a functions as an auxiliary power supply, and supplies power to the electric device constituting the first power and hydrogen supply station 10a, such as the control device 13.

The second power generation device 12 and the hydrogen storage unit 21 may also be omitted. When the hydrogen storage unit 21 is omitted, the first power and hydrogen supply station 10a does not have a function of supplying hydrogen to the outside and the inside, and functions as a power supply station.

(Electric Storage Capacity of First Power Storage Unit 17a and Second Power Storage Unit 17b)

The charge capacity of the power storage device of the first power storage unit 17a of the fifth embodiment is smaller than the charge capacity of the power storage device of the second power storage unit 17b. For example, a lithium ion battery having a voltage of 48 V and an electric energy (electric storage capacity) of 10 kWh is used as the first power storage unit 17a, and a lithium ion battery having a voltage of 48 V and an electric energy (electric storage capacity) of 120 kWh is used as the second power storage unit 17b.

(First Load 19A to Fourth Load 19D)

In the fifth embodiment, the first power storage unit 17a supplies power to the first load 19a to the fourth load 19d.

The first load 19a to the fourth load 19d of the fifth embodiment are electric devices of the first power and hydrogen supply station 10a.

The first load 19a includes an illumination device that illuminates the surroundings of the first power and hydrogen supply station 10a.

The second load 19b includes an imaging device that acquires said surrounding image information.

The third load 19c includes a lock control device of a cargo storage area 29 (such as a delivery box) provided in the first power and hydrogen supply station 10a, and a temperature management device that cools or heats said cargo storage area.

The fourth load 19d includes a display device (such as the station-side display unit 15) that outputs information on the charging status of the first power storage unit 17a and the second power storage unit 17b.

(Fourth Switching Unit 22d)

The fourth switching unit 22d switches the supply destination of power from the input terminal unit 24a between the first power storage unit 17a and the second power storage unit 17b.

(Input Terminal Unit 24a)

The input terminal unit 24a of the fifth embodiment is detachably connected to an external power supply (for example, a commercial power supply or a first electric vehicle c1).

Power from the external power supply connected to the input terminal unit 24a is supplied to the first power storage unit 17a or the second power storage unit 17b via the input terminal unit 24a and the third conversion unit 13a3.

(Switching Control of First Switching Unit 22a, Second Switching Unit 22b, and Fourth Switching Unit 22d)

Normally, the control device 13 controls the first switching unit 22a and the second switching unit 22b such that power from the DC power generation device 11a and the AC power generation device 11b is supplied to the first power storage unit 17a.

When the charge rate R1a of the first power storage unit 17a is equal to or higher than the full charge threshold Thrf and the power P supplied from the first power generation device 11 (DC power generation device 11a, AC power generation device 11b) is equal to or larger than the power threshold Thp, it is determined that surplus power is generated, and the control device 13 controls the first switching unit 22a and the second switching unit 22b such that the power from the DC power generation device 11a and the AC power generation device 11b is supplied to the second power storage unit 17b.

Power from the commercial power supply is mainly supplied to the first power storage unit 17a.

When the commercial power supply is connected to the input terminal unit 24a, the control device 13 controls the fourth switching unit 22d such that the power from the commercial power supply is supplied to first power storage unit 17a.

However, when the charge rate R1a of the first power storage unit 17a is equal to or higher than the full charge threshold Thrf, it is determined that surplus power is generated, and the control device 13 controls the fourth switching unit 22*d* such that power from the commercial power supply is supplied to the second power storage unit 17*b*.

Power from the electric vehicle is mainly supplied to the second power storage unit 17*b*.

When the power supply terminal of the first electric vehicle c1 is connected to the input terminal unit 24*a*, the control device 13 controls the fourth switching unit 22*d* such that the power from the first electric vehicle c1 is supplied to the second power storage unit 17*b*.

However, when the charge rate R1*b* of the second power storage unit 17*b* is equal to or higher than the full charge threshold Thrf, it is determined that surplus power is generated, and the control device 13 controls the fourth switching unit 22*d* such that the power from the first electric vehicle c1 is supplied to the first power storage unit 17*a*.

The control device 13 or the like automatically determines whether the commercial power supply is connected to the input terminal unit 24*a* or the power supply terminal of the first electric vehicle c1 is connected.

The control device 13 makes said determination based on information from a detection unit 13*c* provided around the input terminal unit 24*a*. Said detection unit 13*c* detects a voltage value, a current value, or the like, of power supplied to the input terminal unit 24*a*, or captures an image around a device connected to the input terminal unit 24*a*.

In addition, the input terminal unit 24*a* for connection with the commercial power supply and the input terminal unit 24*a* for connection with the power supply unit of the electric vehicle may be separately provided. In this case, the third conversion unit 13*a*3 for AC/DC conversion of power from the commercial power supply and the third conversion unit 13*a*3 for AC/DC conversion of power from the power supply unit of the electric vehicle are separately provided. The fourth switching unit 22*d* is omitted.

Figure 17:
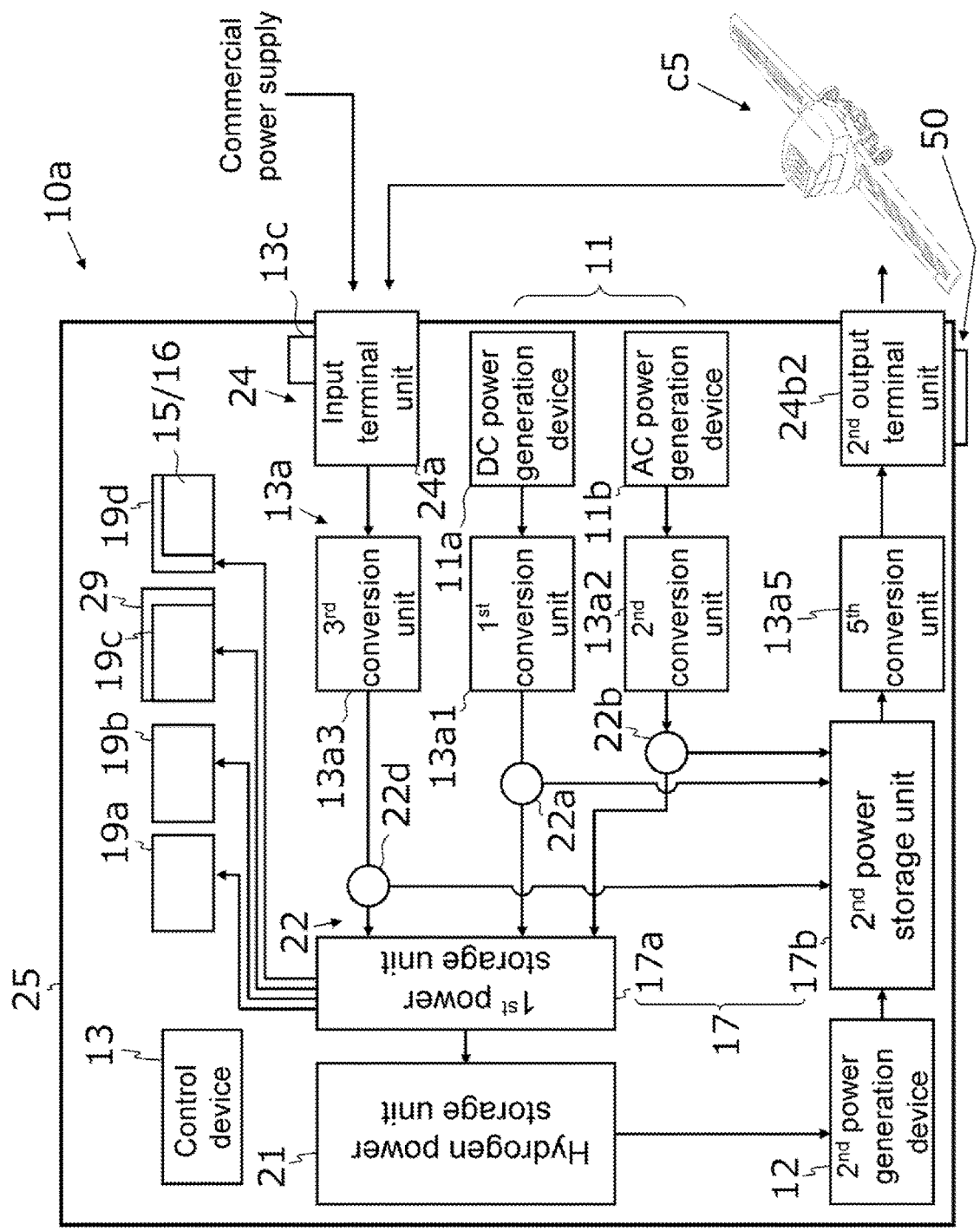
FIG. 17 is a block diagram showing an application example of a configuration of one of the power and hydrogen supply station according to the fifth embodiment.

The example in which the first power and hydrogen supply station 10*a* of the fifth embodiment is fixed to the ground as a charging and feeding stand has been described. However, a moving unit 50 may be provided in the first power and hydrogen supplying station 10*a* (see FIG. 17). The moving unit 50 moves the housing 25 holding each unit of the first power and hydrogen supply station 10*a* at least one of on land, on water, in water, and on air.

During the movement by the moving unit 50, the power from the second power storage unit 17*b* may be supplied to an electric moving device c5 connected to the second output terminal unit 24*b*2.

As the electric moving device c5, in addition to an electric vehicle, a ship, an airplane, and the like that can move by electricity can be considered.

The moving unit 50 is driven by power from the second power storage unit 17*b* or the first power storage unit 17*a*.

(Effect of Power Supply from Electric Moving Device and Charge to Electric Moving Device)

Power supply from the electric moving device c5 (the first electric vehicle c1 or the like) via the input terminal unit 24*a* and charging to the electric moving device c5 via the second output terminal unit 24*b*2 become possible, and the first power and hydrogen supply station 10*a* can be used as a charging and feeding stand of the electric moving device c5.

The first power storage unit 17*a* can be used to drive the load inside the first power and hydrogen supply station 10*a*, and the second power storage unit 17*b* can be used to charge the electric moving device c5 or feed from the electric moving device c5.

(Effect of Providing Cargo Storage Area in Charging and Feeding Stand)

The cargo storage area 29 of the charging and feeding stand (the first power and hydrogen supplying station 10*a*) can be used as a delivery box. In addition, by the first power storage unit 17*a* driving the lock control device (the third load 19*c*) of the cargo storage area 29, the charging and feeding stand and the delivery box can be operated without relying on power supply from the outside.

(Effect of Movable Power and Hydrogen Supply Station)

After moving to a predetermined place by the moving unit 50 or during the movement by the moving unit 50, the power from the second power storage unit 17*b* can be supplied to the electric moving device c5 connected to the second output terminal unit 24*b*2.

(Application Example of Power Supply to Hydrogen Generation Device 21*b*)

In the second embodiment to the fifth embodiment, the example in which the power supply to the hydrogen generation device 21*b* is performed from the first power storage unit 17*a* has been described. However, power may be directly supplied to hydrogen generation device 21*b* from first power generation device 11 or an external power supply connected to input terminal unit 24*a* without through first power storage unit 17*a*. In this case, hydrogen generation device 21*b* electrolyzes the electrolytic solution based on power from at least one of the first power generation device 11, the first power storage unit 17*a*, and the external power supply.

(Application Example in which Supply of Hydrogen to Outside is Omitted)

In the first to fifth embodiments, a form in which hydrogen obtained by the hydrogen generation device 21*b* is supplied to the outside via the hydrogen supply unit 21*g* has been described, but the hydrogen may be used only for supply to the second power generation device 12. In this case, the hydrogen supply unit 21*g* is omitted, and the first power and hydrogen supply station 10*a* does not have a function of supplying hydrogen to the outside and functions as a power supply station.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

REFERENCE SIGNS LIST 1 power and hydrogen supply system
10*a* first power and hydrogen supply station
10*b* second power and hydrogen supply station
10*c* third power and hydrogen supply station
11 first power generation device (renewable energy-derived power generation device)
11*a* DC power generation device
11*b* AC power generation device
12 second power generation device (fuel cell)
13 control device
13*a* first conversion device
13*a*1 first conversion unit
13*a*2 second conversion unit
13*a*3 third conversion unit
13*a*4 fourth conversion unit
13*a*5 fifth conversion unit 13b second conversion device
13c detector
14 charger
14a first converter
14b second converter
15 station-side display unit
16 station-side operation unit
17 fixed power storage unit
17a first power storage unit
17b second power storage unit
17c third power storage unit
18 portable power storage unit
18a holding unit
18b portable power storage device
19a first load
19b second load
19c third load
19d fourth load
20 solar water heater
21 hydrogen storage unit
21a1 water intake unit
21a electrolytic solution supply unit
21b hydrogen generation device
21b1 cathode
21b2 anode
21b3 holding mechanism
21b4 insulator
21c heat retaining and cooling unit
21d hydrogen tank
21d1 buffer tank
21d2 pressure reducing device
21e communication pipe
21f detecting device
21g hydrogen supply unit
21h hydrogenation device
21h1 first catalyst
21i liquid tank
21j dehydrogenation device
21j1 second catalyst
22 switching unit
22a first switching unit
22b second switching unit
22c third switching unit
22d fourth switching unit
23 communication unit
24 input/output terminal unit
24a input terminal unit
24b1 first output terminal unit
24b2 second output terminal unit
25 building (housing)
25a first housing
25b second housing
29 cargo storage area
31a in-vehicle power storage device
31b portable power storage device holding unit
31c in-vehicle fixed hydrogen storage device
31d hydrogen tank holding unit
33a first communication unit
33b second communication unit
33c third communication unit
33d fourth communication unit
35a first display unit
35a1 reservation instruction button on first display unit
35a2 route guide button on first display unit
35b second display unit
35c third display unit
35d fourth display unit
50 moving unit
100 server
110 liquid tank
120 liquid feeding unit
130 heat exchange unit
130a fan
130b spray unit
140 switching device
200 circulation path
210 pump
221 first valve
222 second valve
223 third valve
224 fourth valve
225 fifth valve
226 sixth valve
227 seventh valve
228 eighth valve
231 first heat transfer device
232 second heat transfer device
233 third heat transfer device
234 fourth heat transfer device
235 fifth heat transfer device
236 sixth heat transfer device
b1 eleventh valve
b2 twelfth valve
b3 thirteenth valve
b4 fourteenth valve
b5 fifteenth valve
c1 first electric vehicle
c2 second electric vehicle
c3 third electric vehicle
c4 fourth electric vehicle
c5 electric moving device
Cp current position
Dp final destination
G1 first test target power supply
G2 second test target power supply
LB1 rechargeable load test device
LB2 electrolytic load testing device
P power supplied from first power generation device
Q liquid amount in liquid tank
R1 charge rate of fixed power storage unit
R1a charge rate of first power storage unit
R1b charge rate of second power storage unit
R2 charge rate of portable power storage unit
R3 hydrogen filling rate of hydrogen storage unit
Ru route
t1 first load test mobile device
t2 second load test mobile device
Ta time for power supply from portable power storage unit
Tb time for power supply from fixed power storage unit
Tc time for power supply from second power generation device 11b
Thp power threshold
Thq tank capacity threshold
Thr1 first charge rate threshold
Thr2 second charge rate threshold
Thr3 first hydrogen filling rate threshold
Thr4 second hydrogen filling rate threshold
Thrf full charge threshold
Tht time threshold
TT1 first time

The invention claimed is:
1. A power supply station comprising:
a hydrogen storage unit including a hydrogen generation device that performs electrolysis of an electrolytic solution to generate hydrogen, a first flow rate control device that controls a supply amount of hydrogen obtained by the hydrogen generation device, and an accumulation unit that accumulates hydrogen obtained by the hydrogen generation device;

a fuel cell that generates power based on at least one of hydrogen obtained by the hydrogen generation device and hydrogen accumulated in the accumulation unit;

a fuel cell power storage unit that accumulates power obtained by the fuel cell; and an auxiliary power supply, wherein the first flow rate control device controls the flow of supply amount of at least hydrogen obtained by the hydrogen generation device to the fuel cell, a charge capacity of a power storage device of the fuel cell power storage unit is larger than a charge capacity of a power storage device of the auxiliary power supply, the fuel cell power storage unit supplies power to an external electric device via an output terminal unit, and the auxiliary power supply supplies power to the first flow rate control device.

2. The power supply station according to claim 1, further comprising:

a renewable energy-derived power generation device that generates power based on natural energy; and a power storage unit that accumulates power obtained by the renewable energy-derived power generation device, wherein the auxiliary power supply accumulates the power obtained by the renewable energy-derived power generation device, the charge capacity of the power storage device of the power storage unit is larger than the charge capacity of the power storage device of the fuel cell power storage unit, and the hydrogen generation device performs the electrolysis of the electrolytic solution based on power from at least one of the renewable energy-derived power generation device and the power storage unit.

3. The power supply station according to claim 2, wherein the power storage unit accumulates power supplied from an external electric device via an input terminal unit.

4. The power supply station according to claim 1, further comprising a water intake unit that collects moisture contained in a gas generated by electrolysis in the hydrogen generation device, wherein water discharged at the time of power generation by the fuel cell and water obtained by the water intake unit are supplied to the hydrogen generation device as the electrolytic solution.

5. The power supply station according to claim 4, further comprising:

a solar water heater; and a second flow rate control device that controls a flow rate of water discharged at the time of power generation by the fuel cell and water obtained by the water intake unit passing through at least the solar water heater and the hydrogen generation device, wherein the auxiliary power supply supplies power to the second flow rate control device.

* * * * *